US011479393B2

United States Patent
Isserles

(10) Patent No.: US 11,479,393 B2
(45) Date of Patent: Oct. 25, 2022

(54) INDIVIDUAL HANDHELD FILLED FOOD PRODUCTS COMPRISING EDIBLE ENCLOSING TUBE(S)

(71) Applicant: Ma Cuisine Originale Ltd., Nicosia (CY)

(72) Inventor: Norman Isserles, Geneva (CH)

(73) Assignee: Ma Cuisine Originale Ltd., Nicosia (CY)

( * ) Notice: Subject to any disclaimer, the term of this patent is extended or adjusted under 35 U.S.C. 154(b) by 531 days.

(21) Appl. No.: 16/078,849

(22) PCT Filed: Feb. 22, 2017

(86) PCT No.: PCT/IB2017/000201
§ 371 (c)(1),
(2) Date: Aug. 22, 2018

(87) PCT Pub. No.: WO2017/144972
PCT Pub. Date: Aug. 31, 2017

(65) Prior Publication Data
US 2021/0047098 A1    Feb. 18, 2021

(30) Foreign Application Priority Data

Feb. 22, 2016 (GB) ..................... 1603150

(51) Int. Cl.
*B65D 65/46* (2006.01)
*A23P 10/10* (2016.01)
(Continued)

(52) U.S. Cl.
CPC ......... *B65D 65/463* (2013.01); *A21D 10/025* (2013.01); *A23P 10/10* (2016.08);
(Continued)

(58) Field of Classification Search
None
See application file for complete search history.

(56) References Cited

U.S. PATENT DOCUMENTS 1,236,977 A * 8/1917 Pike ..................... B65D 77/02
426/108
4,784,864 A * 11/1988 Ikeda ................. B65D 81/3272
426/115
(Continued)

FOREIGN PATENT DOCUMENTS

DE   4042255 A * 7/1992 ......... A21D 13/0029
FR   2285814 A2   4/1976
(Continued)

OTHER PUBLICATIONS

"Sushi Art" Published Jan. 15, 2013 Youtube.com www.youtube.com/watch?v=uqf_MPbW6HA (Year: 2013).*
(Continued)

*Primary Examiner* — Viren A Thakur
(74) *Attorney, Agent, or Firm* — Taft Stettinius & Hollister LLP

(57) ABSTRACT

A sandwich wrap including a flexible, edible sheet that is adapted to enfold an edible filling whereby the resulting enclosing tube has both ends open and an auxiliary support situated under the lowermost open end when the wrap is held vertically for consumption, thus restraining filling from exiting. A method using an assembly frame positions the auxiliary support. Filling is stocked in a capped filling storage tube including at least two components that can be disassembled from inside the edible enclosing tube to give the edible enclosed filling. The food product may include a set of separately enclosed different fillings and each edible enclosing tube may be shaped around the filling storage tube to give a cross-sectional form of a circle sector so that the set forms a right circular cylinder. A seepage container assists
(Continued)

assembly in advance of an order to avoid impairment by moisture seeping out of fillings.

13 Claims, 15 Drawing Sheets

(51) Int. Cl.
*A21D 10/02* (2006.01)
*B65D 81/34* (2006.01)
*B65D 85/36* (2006.01)

(52) U.S. Cl.
CPC ............ *B65D 81/34* (2013.01); *B65D 85/36* (2013.01); *B65D 2585/363* (2013.01)

(56) References Cited

U.S. PATENT DOCUMENTS

| | | | | |
|---|---|---|---|---|
| 5,082,677 | A * | 1/1992 | Bear | B65D 85/36 206/551 |
| 5,162,126 | A * | 11/1992 | Thorner | H01F 27/245 426/94 |
| 5,501,140 | A * | 3/1996 | Balleza | A21C 9/08 100/151 |
| 5,753,289 | A | 5/1998 | Ness | |
| 6,382,452 | B1 | 5/2002 | Getachew et al. | |
| 7,757,859 | B1 | 7/2010 | Grossman | |
| 8,794,466 | B2 * | 8/2014 | Zuckerman | G01F 19/00 220/23.83 |
| 8,944,251 | B1 * | 2/2015 | Yecies Heller | B65D 3/261 206/494 |
| 9,199,767 | B1 | 12/2015 | Pheir | |
| 2004/0101605 | A1 | 5/2004 | Sigel | |
| 2006/0165852 | A1 * | 7/2006 | Sheem | A23L 7/196 426/112 |
| 2008/0035636 | A1 | 2/2008 | Grant et al. | |
| 2014/0314902 | A1 | 10/2014 | Maynard | |
| 2014/0322398 | A1 * | 10/2014 | Cheng | A23L 17/60 426/120 |

FOREIGN PATENT DOCUMENTS

| | | |
|---|---|---|
| FR | 2259372 A1 | 8/1985 |
| FR | 2987234 A3 | 8/2013 |
| JP | 57138350 A * | 8/1982 |
| JP | 61028357 A * | 2/1986 |
| JP | 2000247389 A * | 9/2000 |
| JP | 2001258514 A * | 9/2001 |
| WO | 1999016683 A1 | 4/1999 |
| WO | 2004012567 A2 | 2/2004 |
| WO | 2004086886 A1 | 10/2004 |

OTHER PUBLICATIONS

"How To Make Sushi" Published Jun. 26, 2013 Youtube.com www.youtube.com/watch?v=AjnuMJRANLw (Year: 2013).*

"Onigiri" Published Feb. 12, 2014 web.archive.org/web/20140212235120/https://secretsofsushi.com/onigiri.html (Year: 2014).*

"Edible Nori Cups" Published Dec. 14, 2013 https://cookwithkathy.wordpress.com/2013/12/14/edible-nori-cups/ (Year: 2013).*

Rocha, Isai. "Routine, Taquito and Other Burritos That Are Downright Vulgar." Food News Dec. 3, 2014 <web.archive.org/web/20141230041937/https://www.foodbeast.com/news/poutine-and-taquito-burritos-that-are-downright-vulgar/> (Year: 2014).*

Lewis, Alison. "Shrimp and Avocado Sushi Rolls Recipe." Mar. 6, 2012 <https://www.oprah.com/food/shrimp-and-avocado-sushi-rolls-recipe> (Year: 2012).*

Bryan. "California Roll." Sep. 7, 2015 <web.archive.org/web/20150907212159/http://www.secretsofsushi.com/california-roll.html> (Year: 2015).*

"Abigail's Bakery—Unleavened Bread Recipe—The Classic Flour Tortilla." <web.archive.org/web/20120112024522/https://www.abigailsbakery.com/bread-recipes/unleavened-bread-recipe.htm> (Year: 2012).*

"Flickr—Sushi Burrito"—Oct. 17, 2006 <http://www.flickr.com/photos/pixie_bebe/274355103/> (Year: 2006).*

How To Make Flower Sushi Art—Jun. 26, 2013 timestamp at 4:15minutes <http://www.youtube.com/watch?v=AjnuMJRANLw> (Year: 2013).*

International Search Report; European Patent Office; International Application No. PCT/IB2017/000201; dated Oct. 4, 2017; 7 pages.

Written Opinion of the International Searching Authority; European Patent Office; International Application No. PCT/IB2017/000201; dated Oct. 4, 2017; 10 pages.

Anson Packaging; Artisan 2 Tortilla Addition; May 1, 2014; 1 page; Copyright 2013 Anson Packaging.

Marie Schweitzer; Whole Foods Party Platter Review; Connecticut Working Moms; Feb. 28, 2013; 11 pages; Copyright 2011-2016 CTWorkingMom.com.

* cited by examiner

INDIVIDUAL HANDHELD FILLED FOOD PRODUCTS COMPRISING EDIBLE ENCLOSING TUBE(S)

CROSS REFERENCE TO RELATED APPLICATIONS

This application is a U.S. national stage filing of International Patent Application No. PCT/IB2017/000201 filed Feb. 22, 2017, which claims priority to United Kingdom Patent Application No. GB 1603150.2 filed Feb. 22, 2016, the contents of each application hereby incorporated by reference in their entirety.

FIELD OF THE INVENTION

The present invention relates to a novel handheld food product in which one or more edible fillings are enveloped by one or more edible sheets, and has particular reference to a food product of the "fast food" type. The present invention also provides a method for assembling the food product of the invention as well as a filling storage tube for use in assembling the food product and a seepage container for use during storage of the food product.

BACKGROUND

Flatbreads have become a popular, and often healthier, alternative to the yeast raised bread. In general, pliant flatbread, such as a tortilla, can be rolled around a filling. Typically, both ends of the pliant flatbread are folded inwards and around a filing as the flatbread is rolled longitudinally to produce a tubular shaped food product such as a sandwich wrap. Often, this tubular shaped sandwich is closed on one or on both ends by the wrap material to tightly secure the contents. This shape, however, can have several drawbacks which are problematic for a customer who is buying and consuming a sandwich wrap.

One drawback is that the folded in ends of the sandwich wrap generally hide an excess of flatbread dough, which results from considerable overlap of wrapping material that is present at the ends of the tubular assembly. This means of closure of the tube ends usually results in clumps of folded dry bread that are devoid of filling. Consuming these clumps can be an unpleasant experience due to the dry consistency and bland flavor. Further, in that the clumps represent the excess of dough, the nutritional value of a sandwich wrap can be diminished due to the excess carbohydrate associated with the excess dough.

Another drawback of current sandwich wraps is that their tubular shape has a wide cross-section which gives low lateral support to the encompassed fillings and during consumption, the contents of the sandwich wrap easily sill onto the clothes of the consumer. In addition to the obvious mess and inconvenience such a sandwich can cause, the effect is magnified if the consumer is also driving a vehicle when the sandwich spills.

A further drawback of many sandwich wraps is that during extended storage of a sandwich, undesirable moisture and flavor migration can occur between the inner sandwich components and the outer bread of the sandwich. To avoid such migration, segregation of sandwich components is desirable, but in a manner whereby the means of segregation can easily be removed shortly before consumption, leaving the inner sandwich components within the outer sandwich envelope.

Accordingly, there is a need to provide a gourmet fast food product which can overcome the drawbacks of current sandwich wraps.

US 2004/0101603 A1 discloses a handheld sandwich package including a packaging structure having a cavity occupied by an associated sandwich. The associated sandwich is contained within the cavity when the packaging structure is intact. A first section of the packaging structure defines a first portion of the cavity. The first section is appropriately sized to be graspable by an individual. A second section of the packaging structure defines a second portion of the cavity and is removable from the first section to reveal the associated sandwich. An opening is defined by the first section when the second section is removed therefrom. The opening is connected to the first portion of the cavity. The associated sandwich is seated in the first portion of the cavity and extends through the opening, and when the second section is removed the associated sandwich is capable of being held in the first portion of the cavity by exertion of a force on at least one compressible wall of the first section.

From US 2004/0101605 A1 it is evident that the walls of the packaging structure touch the sandwich on only two sides while two other walls have no contact with the sandwich. In particular, US 2004/0101605 A1 discloses that two of the sides are rectangular-shaped and generally parallel with one another whereas the remaining two sides billow outwardly and connect the spaced apart rectangular sides. Only the billowing sides am destined to have contact with the sandwich. This configuration cannot provide pressure around the whole perimeter of the sandwich to assist in holding it together.

US 2014/0314902 A1 discloses an apparatus and method for consuming a wrapped food item in a non-dining or informal dining environment. The method comprises placing the wrapped food item in an upright food holder, removing one or more portions of the upright food order during the press of consuming the wrapped food item, wherein the wrapped food item comprises a substantially cylindrical shape. In one embodiment, the upright food holder comprises a tapered cup design such that portions of the tapered cup are removed during the process of consuming the wrapped food item. Methods for removing portions of the upright food holder comprise string, tape and perforations. The wrapped food item may be burritos, wraps, shawarmas, gyros, falafels and special shaped sandwiches.

As disclosed in US 2014/0314902 A1, the upper rim of the food holder is much wider than its base. This configuration cannot provide pressure on the side of a food product to assist in keeping the food product together. US 2014/0314902 A1 shows a holder containing a sandwich wrap which is slanted, leaning on a side wall. This means that the bottom end of the wrap is also slanted, not parallel to the base of the holder, so there is no pressure to hold closed a lower end of the wrap. Evidently, US 2014/0314902 A1 is not concerned with wraps having open lower ends. In one embodiment, the bottom of the food holder of US 2014/0314902 A1 has an open base, indicating that it is not intended for wrap with an open lower end, since filling would fall out of the wrap and then out through the open base of the food holder.

WO 2004/12567 A2 discloses an apparatus for displaying, supporting and subsequently heating two wraps. For hygiene, each wrap is initially encased in appropriate outer packaging. The apparatus comprises a support within which an appropriate steam generator module is provided for heating the wraps.

FR 2559372 discloses a device for facilitating the consumption of foods such as pancakes, sausages, etc., characterised in that it consists of a tubular body close to one end by a base having a lateral prehensile tongue, the sidewall of the body having at least one longitudinal slot.

WO 99/16683 A1 discloses a hand-held food package which enables heterogeneous foods, such as filled pastas, burritos, and the like, to be shipped, stored and heated within the same disposable package from which they are extruded for direct consumption by the consumer without utensils, the package comprises an elongated container containing the food mass, and a piston slidably received at one end of the container.

U.S. Pat. No. 7,757,859 BI discloses a dispensing apparatus for packaging and dispensing a single service portion of a food product. The food product is contained within an inner container cavity formed by an outer cover and a centre member. Draw portions are provided for transferring a force from the user to the outer cover, whereby the force peels the outer cover from the centre section, thus folding the outer cover over itself as it is removed from the centre section. Food product is dispensed when the inner container is opened by removing the outer cover from the centre member. An optional outer container seals and holds portions of bread or other sandwich portions while the inner container is located therebetween.

OBJECTS OF THE INVENTION

It is an object of the present invention to provide an individual, handheld food product comprising edible enclosing material and a plurality of edible fillings in which the edible fillings are enveloped in such a manner as to conserve the distinctive taste of each component.

It is another object of the present invention to provide a novel individual, handheld food product comprising one or more edible wraps and one or more sweet or savory edible fillings in which such edible fillings are stably contained within the wrap, whilst the food product contains less edible enclosing material as compared with current sandwich wrap products.

It is a different object of the present invention to provide a wrap for a food product which may be used to enclose a moist filling, without significant egress of moisture from the filling through the exterior of the edible-wrap.

It is yet another object of the present invention to provide an individual, handheld food product comprising one or more edible wraps and one or more edible fillings which has attractive organoleptic characteristics.

It is yet another object of the present invention to assist assembly of the food product as far as possible in advance of actual demand, so as to expedite completion of orders when received.

SUMMARY OF THE INVENTION

The present invention has multiple aspects that are linked to implement a single inventive concept. The following description presents an overview of the interaction of these multiple aspects, which are identified below. Details of each of these multiple aspects are specified later below.

The fundamental inventive concept of the present invention concerns a food product, such for example as a sandwich wrap, to be held approximately vertically for consumption which comprises a generally rectangular, edible enclosing sheet that is rolled around an edible filling to form an edible enclosing tube open at both ends and having an outside flap where one end of the sheet overlaps a portion of the sheet forming the tube, where the filling is constrained from leaving a lower end of the tube by an external auxiliary support, and where the outside flap of the rolled tube is constrained from opening by a means of applied pressure. To produce these two types of constraints, a method is used where the freedom of movement of the outside flap and the freedom of movement of the filling may each be first blocked by resources which a applied provisionally. This provisional application is advantageous since the permanence of these constraints would interfere with the comfortable consumption of the food product. Whilst the outside flap and the filling are held in place by the provisional constraints, durable constraints are introduced, alar which the provisional constraints may be removed.

The following is an example of constraints on the enclosed filling described above:

(a) Provisional Constraints

With the product is held vertically in an inverted position, i.e. with its lower end uppermost and an opposite upper end lowermost, the enclosed filling is provisionally capped at its upper and to prevent filling from dropping out through that end while the tube is held in this orientation. The outside gap of the rolled tube is provisionally constrained from opening by pressing the flap against a vertical surface.

(b) Durable Constraints

Whilst pressure on the outer flap is applied by hand or by mechanical means, an auxiliary support is placed over the open lower end of the tubular enclosed filling. An open and of cylindrical consumer packaging is lowered over the auxiliary support and over the lower and of the tubular enclosed filling and slid progressively downwards until an opposite, closed end of the packaging fits over the auxiliary support and over the lower end of the tubular enclosed filling. A band is wrapped tightly wound the centre of the consumer packaging and the free end of the band is fastened to the part of the band already wound around the packaging. The packaging thus holds closed the outer flap of the tube and the packaging together with the auxiliary support hold closed the lower end of the tube. The consumer packaging with the tubular enclosed filling and with the auxiliary support inside is then righted by rotating it through about 180° so that the packaging is positioned lowermost.

(c) Removal of Provisional Constraints

The provisional capping entity over the uppermost end of the tubular enclosed filling may then be removed, since no filling normally leaves the upper end when the packaging is held correctly.

In an embodiment which gives greater security of closure, the food product may comprise a set of enclosed fillings each formed from a rectangular edible sheet that is rolled around an edible filling to produce a tube that is open at both ends. To assist in provisionally constraining the freedom of movement of the outside flaps of the tubes in the set, an assembly frame as described in more detail below may be employed to maintain vertically the enclosed fillings during assembly of the food product, as well as to position the outside flap of one tube of enclosed filling against the closed wall of an adjacent tube.

Following is an example of the constraints on the set of enclosed fillings using the assembly frame:

(a) Provisional Constraints

Each tube of the set of enclosed fillings is provisionally capped at its upper end to prevent filling from dropping out through that end. The capped upper end of each tube is placed in a respective compartment of the assembly frame, oriented so that the outside flap of the tube is pressed against the wall of an adjacent tube in the assembly frame, to keep the flap closed. The assembly frame holds each tube vertical so that the uncapped end is uppermost, avoiding the exit of filling.

(b) Durable Constraints

An auxiliary support is then placed over the open lower ends of the upright set of enclosed fillings. The open end of cylindrical consumer packaging is lowered over the auxiliary support and over the ends of the upright set of enclosed fillings and then pulled downwards until the closed end of the packaging fits over the auxiliary support and over the ends of the set of enclosed fillings. A band is wrapped tightly around the centre of the consumer packaging and the free end of the band is fastened to the par of the band already wound around the packaging. The packaging thus holds closed the outer flaps of the set of enclosed filings and the packaging, together with the auxiliary support, bold closed the uncapped lower aids of the set of enclosed filling. The assembly frame and the consumer packaging with the set of enclosed fillings inside are then rotated so that the packaging is positioned lowermost and the assembly frame as well as the capping entities are positioned uppermost.

(c) Removal of Provisional Constraints

The provisional assembly frame may then be removed from the set of enclosed fillings. The provisional capping entities over the upper ends of the tubular enclosed filings, which are now disposed uppermost, are then removed, since no filling normally leaves the upper end when the packaging is correctly held approximately vertical.

When the food product is nearly all consumed, further biting into it may lift the remains of the edible enclosing tube off the contained residual filling. To enable the implementation of the open lower end of the tubular enclosed filling, this drawback needs to be overcome by catching the residual filling in the auxiliary support that is positioned at the base of the consumer packaging, so that the residual filling can also be consumed.

In an embodiment as described below, a retaining layer may be placed between the open lower end of said filled tube and said auxiliary support. Said retaining layer assists in implementing the open lower end of the food product since said layer overcomes the drawback of filling dropping out of the open end of the tube(s). This is because said filling can be caught on said retaining layer, then be picked up with said retaining layer and eaten.

The tubular enclosed fillings may be circular in cross-section, but adjoining tubes in a set of enclosed fillings would only touch on a single line parallel to a longitudinal axis of the tubes, and, if this line of contact were to be positioned away from the longitudinal edge of the outside flap, the rolled tube could open. Greater closure security is achieved in embodiments of the invention in which the cross-section of each enclosed filling is a circle sector, enabling the tubes to touch each other along a substantial proportion of their flat walls.

To produce filled tubes with the cross-sectional shape of a circle sector, it is practically impossible to use prior art methods of forming a wrap by rolling an edible envelope around a loose edible filling. Instead, a further aspect of the present invention comprehends using a filling storage tube with the cross-sectional shape of the desired circle sector as well as with the desired longitudinal length, into which the edible filling is loaded. An appropriate rectangular edible envelope is then wrapped around the filling storage tube so as to form the desired circle sector cross-section.

To implement the filling storage tube, it is necessary to be able to disassemble it easily from within the enclosing tube so as to leave inside the latter just the filling; this may be achieved through a kit comprising at least two separate interengaging wall components of the storage tube, which can be easily slid apart.

In yet another aspect of the present invention, a seepage container may be provided to enable the enclosed filling to have an open lower end and yet avoid the draining of excess moisture from the filling through this open lower end into the auxiliary support, so as to prevent the saturation of the envelope of the enclosed filling by accumulated seepage. The seepage container may be placed over the open top open end of the enclosed filling(s), then the food product is rotated so that, until the food product is consumed, this container is positioned lowermost and held in this position in a crate, if the food product is assembled in advance of demand.

The following summarizes the different aspects of the present invention. Some or all of these aspects may be used in combination.

An auxiliary support for closing the open lower end of an edible enclosing tube.

Consumer packaging which holds the auxiliary support in place.

Use of a set of edible enclosing tubes which position the outside flap of one tube of enclosed filling against the closed wall of an adjacent tube to give security of close of the open ended enclosing tubes. These tubes may have a circle sector cross-section, so as to apply more stable pressure over the flat sides.

Filling storage tube with circle sector cross-section to provide the framework for forming enclosed filling tubes with circle sector cross-section.

Seepage container to allow the use of edible enclosing tubes with open lower ends by capturing excess moisture from fillings.

The description below is organised according to the utilitarian aspects of the invention. Thus information presented above to indicate the linkage of involved aspects is rearranged so as to communicate the manner of making the invention and to show its usefulness.

Finished Food Product

According to one aspect of the present invention therefore there is provided an individual handheld food product comprising:

one or a plurality of side-by-side contiguous edible enclosing tubes, the or each edible enclosing tube having open upper and lower ends, which define an axis therebetween that is oriented generally vertically when the food product is eaten, a lower and region proximate the lower end and an upper end region proximate the upper end and containing edible filling; and at least one auxiliary support fitted over the open lower end of at least one edible enclosing tube, the auxiliary support having at least one side wall that is disposed around the lower end region of the at least one edible enclosing tube and a solid bottom wall that extends across the open and of the at least one edible enclosing tube for supporting the at least one edible enclosing tube in use and for preventing the edible filling from escaping from the open lower end.

The handheld food product of the present invention may therefore comprehend an individual sandwich wrap comprising at least one flexible sheet of edible material that is rolled to enfold an edible filling, whereby the resulting edible enclosing tube has both ends open and, since said sandwich wrap is preferably held approximately vertically for consumption, an auxiliary support is situated under its lower open end so as to restrain said filling from exiting downwards. It is necessary to position said auxiliary support below said lower open end without filling dropping out under the force of gravity and in a later section, an example of a method is given which fulfills this requirement, with the assistance of an assembly frame specified below in this document. The innovation of said aspect of the present invention and of said method is to achieve closure of the sandwich wrap through said auxiliary support instead of through dry, tasteless, clumps of folded edible material at the ends of current sandwich wraps. As such, the upper and lower ends of the edible enclosing tube(s) are not folded over the open ends of the tube(s).

Suitably, the one or more edible enclosing tubes have a generally cylindrical composite shape. The diameter of each edible enclosing tube may be between about 1.5 cm and about 5 cm, preferably between about 2.5 cm and about 3.5 cm. The edible enclosing tube or plurality of edible enclosing tubes are shaped such that the food product is generally tubular, being generally circular in cross-section (within the confines of a food product made from a flexible wrap), to ensure the edible filling(s) are held tightly within the tube(s) and to facilitate handling of the food product for eating by hand. In a product with multiple enclosing tubes, the width of each tube across the axis between the upper and lower ends will generally be smaller than the diameter of a tube in a product consisting of a single tube, so that the total diameter of the product is within the range mentioned above for ease of handling. Regardless of the number of edible tubes, the food product may have a height of between about 5 cm and about 25 cm, preferably between about 10 cm and about 15 cm or 20 cm.

In some embodiments, the handheld food product of the invention may comprise a single edible enclosing tube, fitted with an auxiliary support over its lower end.

In some embodiments, the food product of the invention may comprise a plurality of edible enclosing tubes disposed contiguously side-by-side one another.

Auxiliary Support

The auxiliary support may take any form which is capable of restraining the exit of filling from said edible enclosing tube without interfering with the portability of the handheld fast food and which can accumulate any unintentionally emitted filling. Thus, the auxiliary support may suitably define a recess that accommodates the lower end region of the at least one edible enclosing tube of the individual food product. The auxiliary support may have an opening to receive the lower end region of the at least one edible enclosing tube. The solid bottom wall of the auxiliary support serves to supports the at least one enclosing tube in use and should be strong enough for that purpose. In particular, the auxiliary support may serve as an individual supporting tray for the at least one enclosing tube.

The strength of the bottom wall of the auxiliary support that is needed will depend on the size of the respective enclosing tube or, where a single enclosing tube is used, the width of the food product as a whole. Suitably, the auxiliary support may be made from a sheet material having a basis weight of the in the range about 170-350 $g/m^2$, e.g. 250 $g/m^2$. In some embodiments, paper may be used as the sheet material. The same technology used for paper cups may be applied to seal the seams of the sidewall and the bottom wall of the auxiliary support.

In an alternative embodiment, the auxiliary support may be made from an edible material. For instance, an edible auxiliary support may be made from unleavened dough having an oil content (e.g. 5 to 7% wt.) such that it can be baked to a crunchy consistency, resistant to moisture.

The auxiliary support and residual filling falling from the enclosing tube(s) can then be eaten together instead of scooping the residual filling out of the support.

In some embodiments, the sidewall of the auxiliary support around the opening may be dimensioned to form a close fit around the lower end region of the at least one edible enclosing tube so that the auxiliary support does not easily slide off the lower end of the enclosing tube under gravity. Suitably, the auxiliary support is dimensioned at least round its opening to form an interference fit with the lower end region of the at least one edible enclosing tube. Thus, the auxiliary support may be fitted to the lower end region of the at least one edible enclosing tube in the manner of a sleeve or end-cap. In some embodiments, the auxiliary support may accommodate the lower end regions of more than one edible enclosing tube, forming a snug, or even tight, fit therearound.

In other embodiments, the sidewall of the auxiliary support may be shaped to match the shape of the at least one enclosing tube, but of slightly larger dimensions to form a loose fit on the lower end of the at least one enclosing tube.

It will be appreciated that, suitably, the sidewall of the auxiliary support should be generally tubular, having a circular cross-sectional shape that corresponds to the cross-sectional shape of the one or more enclosing tubes around which the support is designed to fit. In embodiments, where there are several contiguous enclosing tubes, each with its own auxiliary support, each support should preferably be shaped and sized so that when the supports are fitted to their respective edible tubes and assembled contiguously to form an individual food product, the composite outer cross-sectional shape of the contiguous auxiliary supports is generally circular to match the outer shape of the complete individual food product. Similarly, where a single auxiliary support is provided over the lower end region of a single edible enclosing tube or several contiguous edible tubes, the cross-sectional shape of the support should preferably be circular to form a close fit around the lower end regions of the single tube or plurality of contiguous tubes. Advantageously, a single auxiliary support may be used to help hold together a plurality of contiguous edible tubes in a single food product according to the invention.

Suitably, the one or more auxiliary supports should have a cylindrical composite shape to match the shape of the one or more edible enclosing tubes. In one embodiment, a single cylindrical auxiliary support, with a circular bottom wall and cylindrical side-wall that is close-fitting may be used to cap the lower end of the cylindrical one or more edible enclosing tubes. The height of the cylindrical wall may be in the range about 5-33%, preferably about 10-25%, more preferably about 12-18%, of the height of the one or more edible enclosing tubes.

The sidewall of the auxiliary support may have a height of between about 1 cm and about 5 cm, preferably between about 1.5 cm and about 2.5 cm, so that all or substantially all of the individual food product can be consumed without removing the product or any part of it from the auxiliary support, which would risk losing some of the edible contents through the open lower end of the enclosing tube or tubes. As described above, the width of the auxiliary support should be matched to the diameter of the individual food product and will depend on the number of auxiliary supports that are used in the product.

Suitably, the auxiliary support may be microwave-safe. The auxiliary support may be made from any suitable material, but is suitably formed from a moisture resistant material, a biodegradable material, or paper optionally coated with a layer of food-safe polyethylene. In some embodiments, the auxiliary support may be edible.

A utility of said auxiliary support stems from the fact that when said sandwich wrap is nearly all consumed, further biting into it may have the effect of lifting the remains of said edible enclosing tube off the contained residual filling, which is caught in said auxiliary support that is positioned lowermost in the assembly, enabling said residual filling to be eaten out of said base receptacle.

In an embodiment, said auxiliary support may take the form of a base receptacle, which may have a cavity that accommodates the lowermost end of said sandwich wrap. Suitably the auxiliary support may resemble a circular bowl or tray with a sidewall and a bottom wall. In a further embodiment, said base receptacle may have a short, slighted tapered, truncated conical form, so as to enable nesting of stocked base receptacles.

Retaining Layer

In an embodiment, a retaining layer may be placed between the lower and of said sandwich wrap and said auxiliary support, so that morsels of said residual filling which may exit said edible enclosing tube can be caught on said retaining layer, then be picked up with said retaining layer and eaten. In variants, said retaining layer may be edible or may be constituted of individual segments which together cover the bottom of said auxiliary support, or may be both edible and constituted of individual segments, for example crackers, so that they may be eaten together with the morsels of residual filling which fall on them.

Edible Enclosing Sheet

In an embodiment which substantially reduces edible wrapping material of the food product compared to the excessively overlapping surfaces of current sandwich wraps, said edible enclosing tube may be formed from a generally square or rectangular, flexible, edible enclosing sheet, which is wound around said filling by aligning one side of said edible enclosing sheet with a straight edge parallel to the longitudinal axis of said filling, the length of said side being approximately equal to the length of said filling, then rolling said edible enclosing sheet over said filling in a direction substantially perpendicular to said edge until said edible enclosing sheet fully encompasses said filling and further overlaps the formed tube to close off the cylindrical perimeter of said tube, this encompassing and overlapping ability determining the dimensions of said edible enclosing sheet.

In some embodiments, the rectangle may have a length of about 16.7 cm and a width of about 15.5 cm, which is cut from rolled dough to form an edible enclosing sheet, which may give an edible enclosing sheet having a length of 15 cm and a width of 14 cm after baking.

Said edible enclosing sheet may be made from any edible material which has the properties necessary for forming a sandwich wrap, including the flexibility to be wound around edible fillings. Suitably, said enclosing sheet may be made from a dough. In some embodiments, said sheet may comprise a savory dough, e.g., dough of the kind used for making flatbread, especially of the kind used in sandwich wraps. Alternatively, said dough may comprise an egg-based pancake dough, which may be particularly suitable for use in the formation of desert food products.

Suitably, said edible enclosing sheet may be cooked prior to assembly with the edible fillings.

Set of Enclosed Fillings

In an embodiment, the food product may comprise a set of edible fillings, each of which may be of a different variety of food and each of which may be contained in an individual edible enclosing tube to form an enclosed filling. The individual edible enclosing tubes may be arranged contiguously side-by-side one another in the food product of the invention. Mostly, the edible fillings chosen for the food product may be for the main course of a meal or for a dessert. Suitably, each enclosed filling may have a cross-section which is dimensioned for easy insertion into the mouth and furthermore the cross-section of each enclosed filling may be of such a form that when said enclosed fillings of the set are held next to each for consumption, with their longitudinal axes parallel, they fit into one hand, giving the facility characteristic of hand-held food.

In a further embodiment, in order to hold together more easily said set of enclosed fillings, each tubular enclosed filling of the set may have a cross-section perpendicular to its longitudinal axis which is approximately a circle sector, with all cross-sectional radii of said set having the same length and where the sum of the central angles of the cross-sections of said set equals 360 degrees. On juxtaposing said enclosed fillings so that said radii of their cross-sections are contiguous, the overall cross-section of said set of may be approximately circular and the overall spatial shape of said set may be approximately a right circular cylinder whose diameter is suitably limited to a size which allows the consumer's hand to curve around the exterior of the structure and hold it firmly in one hand.

The enclosure of each filling of the set of fillings in a separate edible tube but where the members of said set are grouped together in one hand has the advantage of enabling the consumer to savor the distinctive flavor of a separately enclosed filling and then to rotate the cylindrical said set of enclosed fillings in his hand to successively select and savor other enclosed fillings in said set by bending with his other hand the upper part of the chosen enclosed filling towards the consumer's mouth, away from the other members of said set, so that he can easily bite into it. A further advantage of said set of enclosed fillings is that the distribution of the total amount of fillings of the food product over individual edible tubes results in a small cross-section of filling in each tube, which not only leads to the individually enclosed fillings of the food product being easy to bite but also lowers the risk of spillage of the well enclosed fillings.

In an embodiment, for a set of enclosed fillings, their lower ends may be placed together in a single auxiliary support or base receptacle as described above, which is optionally covered by said retaining layer. In alternative configurations, the lower end of each enclosed filling in said set of edible fillings may be placed in its own auxiliary support or base receptacle, or the lower ends of more than one enclosed filling may be placed in a single auxiliary support or base receptacle.

In an embodiment, to achieve the containment of fillings in individual edible enclosing tubes without elaborate provisions, the individual tubes are maintained closed by mutual pressure of adjoining tubes in said set on each other. To put progressively in place the members of the set of enclosed fillings, the assembly fame described in a later section of this document may be used. The maintenance of mutual pressure of adjoining tubes to keep the tubes closed is assisted by the consumer packaging encompassing the set of enclosed tubes, described subsequently in this document.

Filling Storage Tube

For convenience, a portion of edible filling corresponding to the amount of a particular variety of food needed for the food product may be held in a filling storage tube which may be made from rigid or semi-rigid material and which comprises at least two components that are joined along lines that nm down the length of said filling storage tube parallel to its longitudinal axis. Suitably, at least one end of said filling storage tube is sealed by a detachable cap, by a covering film or by some other removable capping entity. The cap may be made of food-safe silicone rubber or shrink film.

Thus, in another aspect of the present invention there is provided a filling storage tube having a cross-sectional shape of a sector of a circle comprising an arc and two radii, the filling storage tube having two opposite ands that define a longitudinal axis therebetween and comprising at least two separate interengaging wall components having smooth surfaces that are releasably fastened one another along longitudinal lines of interengagement. Suitably, the wall components may be in continuous contact with one another along the longitudinal lines of interengagement. They are suitably made of sterilisable, microwave-safe material such, for example, as high density polyethylene. In some embodiments, the wall components may be biodegradable.

The filling storage tube of the invention may contain edible filling. Said filling storage tube thus assists partial assembly of the food product in advance of orders by facilitating the preparation as well as storage of fillings in the required portions for the food product, even away from the site of distribution, and furthermore the filling storage tube enables said edible enclosing tube to be formed more precisely and more easily by providing a framework around which said edible enclosing sheet may be wound, according to the procedure described above. In some embodiments, the edible filling may be frozen before or after being filled into the filling storage tube.

Said filling storage tube may easily be disassembled from inside said edible enclosing tube by detaching said capping entity from said filling storage tube, then by grasping the wall of each filling storage tube component in turn and pulling out said component, thereby leaving said edible filing contained uniquely within said edible enclosing tube. The longitudinal lines of interengagement between the wall components allow the wall components to be slid axially apart in this manner, and the smooth surfaces of the wall components are designed to avoid sticking to the fillings. Suitably, the first and second wall component, or either component, may comprise a protrusion or handle to assist grasping the component for sliding the wall components apart along longitudinal lines of interengagement and removing them from the edible enclosing tube.

In an embodiment, the filling storage tube is given a cross-sectional area in the form of a circle sector so that on winding said edible enclosing sheet around said filling storage tube, the resulting edible enclosing tube acquires the circle sector cross-sectional form, which enables the set of enclosed fillings to form an approximate right circular cylinder, as described above. This circle sector cross-sectional form may be produced by a first component of said filling storage tube having the cross-sectional V-shape formed by the two radii delimiting said circle sector and the second component of the tube may have the cross-sectional form of the arc of said circle sector. In some embodiments, each arm of the V-shape may have a length of about 2.5-3 cm and a thickness of about 0.75-1.5 mm in section across the longitudinal axis of the product. In some embodiments, the first wall component may be substantially rigid, and the second wall component may be relatively elastic and provided with lateral formations for gripping the sides of the first component for slidably holding the two components together. In order to attach these two components together, each extremity of the arc-shaped cross-section of the second component may thus terminate in an end-section which extends radially from the ends of the are in the direction of the vertex subtended by the arc, where said end-sections may wrap around the V-shaped cross-sectional form of said first component and press said two components of the tube walls together. Alternatively, for each pair of longitudinal edges of the components which are to fit together, the first edge may incorporate a groove and the second edge may finish with a projecting ridge which fits inside said groove so that edges of the two components may be attached by sliding the ridge edge inside the groove of the other edge. In a further alternative, one component may be substantially thicker than the other, so that a groove may be formed on the longitudinal edges of the thicker component into which the corresponding edges of the thinner component may be slid. In yet a further alternative, the loaded and assembled filling storage tube may be held together within shrink wrapping, where the wrapping may easily be removed through an incorporated tear strip. Other means may be employed to attach said components, yet allow easy disassembly, In an embodiment, each said component may have on top of at least one end a means to assist grasping the component in order to draw it out during disassembly, such as a protrusion on its wall or such as a flexible handle which may be bendable at right angles to the longitudinal wall of said component so as to fold said handle across the opening of said filling storage tube and which may be held down with the covering which seals the assembled filling storage tube until said covering is removed from said filling storage tube, when said handle may return to its original position in the direction of the longitudinal wall of the component.

In an embodiment, said filling in said filling storage tube may be composed of more than one type of foodstuff distributed within said filling storage tube so as to provide a pleasing variation in taste as well as in color and texture down the length of said filling storage tube as well as over its cross-section, which gives rise to the same variations for said edible filling after its enclosure inside said edible enclosing tube.

In yet another aspect of the invention there is provided a kit for assembling a filling storage tube according to the invention, the kit comprising at least two separate interengaging wall components having smooth surfaces that can be releasably fastened to one another along substantially parallel lines of interengagement to form a filling storage tube having the cross-sectional shape of a sector of a circle, the tube having two opposite ends that define a longitudinal axis therebetween, and the lines of interengagement extending along the length of the filling tube substantially parallel to its longitudinal axis, whereby the wall components can be slid apart along the lines of interengagement. The interengaging wall components may be configured to contact one another continuously along the lines of interengagement when assembled.

In a different aspect of the present invention there is provided a crate comprising a plurality of filling storage tubes according to the invention, in which each filling storage tube is sealed to preserve the filling during transportation or storage.

Toppings

When said components of said filling storage tube are removed from the wrapped filling storage tube during assembly of the food product, a small space may form above each filling, this indentation being surrounded by the wall at the top of said edible enclosing tube. A topping may be placed into said indentation just before consumption of the food product so as to enhance said enclosed filling. A different topping or toppings may be placed in each edible enclosing tube, if there are more than one of these in the food product.

Sauce

If a consumer wishes a sauce to be added to a filling, this may be done just before consumption of the food product, for example by using a marinade or seasoning injector containing the sauce. However, since an appropriate sauce may be integrated in a filling during preparation of the food and said filling storage tube may enable components that enhance flavor to be stably held in fillings, consumers of the food product may not have the same fancy to add sauces as is the case with current fast food products.

Assembly Frame

An assembly frame may be employed to maintain vertically the one or more enclosed fillings or wrapped filling storage tubes during assembly of the food product, as well as to assist juxtaposition of items in a set of enclosed fillings or wrapped filling storage tubes which need to be grouped so as to prepare the food product. The assembly frame consists of one or more compartments, suitably with one compartment for each enclosed filling in the food product. Each of the one or more compartments of said assembly frame may have an internal cross-sectional form which accommodates the external cross-section of said enclosed filling or said wrapped filling storage tube with a small margin of tolerance. Said assembly frame may have a base surface attached below the one or more compartments, so that said one or more enclosed fillings or said one or more wrapped filling storage tubes do not slip downwards, out of the assembly frame, after their insertion into it. The height of said assembly frame may be such that it may grip only a small part of the and region of the vertically standing one or more said enclosed fillings or one or more said wrapped filling storage tubes.

The height of the assembly frame may be about 2-5 cm, typically about 2.5 cm. In embodiments offering an adult serving, where the food product is about 15 cm long, the food product may project about 12.5 cm above the assembly frame during production.

Consumer Packaging

Said one or more enclosed filings, any retaining layer and said auxiliary support may be placed in consumer packaging to keep them together and to provide a wrapping which may allow the consumer to hold the food product cleanly in his hand. According to yet another aspect of the present invention therefore there is provided packaging for a food product comprising.
(a) a bag for receiving a food product according to the present invention, the bag having a lower section for receiving the lower end regions of the one or more edible enclosing tubes of the food product and an open upper end; and
(b) a band that is fastenable around the bag.

In some embodiments, the lower section of the bag may comprise a base that is shaped and arranged to be disposed underneath the at least one auxiliary support when the food product is disposed in the bag. The base may be adapted to bear the at least one auxiliary support. Alternatively, the bag may have the required properties to act by itself as the auxiliary support. For instance, at least one auxiliary support may be integrated into the lower section of the bag.

In an embodiment, said packaging may be shorter than the food product, allowing the end of the one or more enclosed fillings to protrude so as to present them to the consumer and enable him to easily bite into the food product even without initially opening the packaging. Alternatively, said packaging may entirely cover or envelop the food product, so as to be more easily transportable. Said bag and band, advantageously made, for example, from lightweight paper or from other suitable food-safe, tearable materials may easily be torn open, so that as the consumer eats the food product, he can tear away the packaging and further bite into the exposed food product. In some embodiments, the packaging may be made of microwave-safe material such, for example, as paper. A further advantage of paper packaging is that in the presence of more than one enclosed filling, the consumer's hand clasped around the paper packaging closely shapes the packaging around the enclosed fillings and holds them snugly together in a cylindrical form, especially in the late stage of consumption, when the packaging has been torn down to the encircling band. For this purpose, in some embodiments, the bag, or at least its lower section, may form a snug fit around the food product. The packaging may suitably be torn down to the auxiliary support, which may advantageously be made of a material which is difficult to tear, so that said residual filling may be retained for consumption on said auxiliary support. Conveniently, a top rim around the open upper end of one or both of the bag and the band is formed with a series of notches to facilitate tearing.

The band, which may be of the same or different material as the consumer packaging, may be fastened around the consumer packaging, for example midway along its longitudinal axis, to attach the packaging firmly to the enclosed food, as well as to anchor said auxiliary support inside the packaging under the one or more enclosed fillings.

In an embodiment, said auxiliary support may be stuck to or otherwise integrated into said consumer packaging which simplifies assembly of the food product, since it allows said auxiliary support and said consumer packaging to be placed together over the food product in a single action.

According to yet another aspect of the present invention therefore there is provided a packaged food product comprising a bag having an open upper end and a closed lower section; a food product according to the present invention that is received in the bag such that the open upper ends of the one or more edible enclosing tubes of the food product protrude from the open upper end of the bag, the auxiliary support being integrated into the lower section of the bag; and a band fastened around the beg between the lower section and the upper end for pressing against and holding the bag firmly in position around the food product.

The consumer packaging of the present invention therefore facilitates the application of pressure to hold closed the outside flap of the one or more rolled enclosing tubes of the food product, the application of pressure to hold closed the open lower end of its one or more enclosing tubes and the application of pressure to hold together the adjacent multiple enclosing tubes which may constitute the food product of the present invention.

The present invention also provides crate comprising a plurality of packaged food products in accordance with the invention, the crate comprising a plurality of cells, each cell been configured to accommodate one food product.

Method of Assembly

In another aspect of the present invention there is provided a method of assembling food products in accordance with the invention comprising:
(a) providing an inedible filling storage tube containing edible filling according to the present invention;
(b) providing an edible enclosing sheet; and
(c) wrapping the edible enclosing sheet around the filling storage tube intermediate its two ends until the edible enclosing sheet overlaps itself to form an edible enclosing tube having open upper and lower ends defining a longitudinal axis therebetween, an upper end region proximate the open upper end and a lower end region proximate the open lower end, thereby enclosing the filling storage tube.

In some embodiments, steps (a) to (c) may be performed a plurality of times to form a plurality of edible enclosing tubes and then assembling the plurality of edible enclosing tubes contiguously side by side one another to form the food product. As described above, each of the plurality of edible enclosing tubes may have a cross-sectional shape of a sector of a circle subtending an internal angle approximately equal to 360° divided by the number of edible enclosing tubes, such that when arranged contiguously side-by-side, the edible enclosing tubes form a generally cylindrical food product.

Advantageously, the plurality of edible enclosing tubes are arranged such that the overlapping portion of each edible enclosing sheet is disposed between two adjacent edible enclosing tubes.

In some embodiments, the plurality of edible enclosing tubes may be assembled in a contiguous side-by-side arrangement with the aid of an assembly frame of the kind described above; the assembly frame having a plurality of compartments, each of which is shaped to receive an upper end region of a respective one of the edible enclosing tubes, having an internal cross-sectional form that corresponds to the external cross-sectional form of the edible enclosing tube with a small margin of tolerance, and optionally a bottom wall In the case of fillings directly contained in enclosing tubes, one or more said enclosed fillings are placed and held vertically in the one or more compartments of said assembly frame, with one enclosed filling per compartment. In the case of use of said filling storage tubes instead of directly enclosed fillings, one or more said wrapped filling storage tubes are placed and held vertically in the one or more compartments of said assembly frame, with one wrapped filling storage tube per compartment, and said capping entity on the end of each wrapped filling storage tube distant from the assembly frame is then removed. In both previously cited cases of this paragraph, the open end(s) of said one or more tubes containing filling distant from the assembly frame are covered, optionally, by said retaining layer, which in turn is covered by said auxiliary support that may be placed as an independent entity or incorporated into said consumer packaging. Said consumer packaging is lowered over the assembly and the attaching band of said consumer packaging is fastened. The packaged bundle is grasped and the supporting assembly frame that holds in place said one or more tubes containing filling is used to raise said packaged bundle and invert it in order to place said consumer packaging lowermost with said assembly frame uppermost. In an embodiment, said consumer packaging is shorter than the food product and said assembly frame grips only a small part of said one or more tubes containing filling so that at least part of said assembly frame is not covered by the consumer packaging, which enables said assembly frame, when it is uppermost, to be easily grasped as well as removed from the top of said one or more tubes containing filling.

Seepage Container

If the food product is assembled in advance of an order, it might be impaired by moisture which is liable to seep out of the fillings in the time interval until the order be received. This moisture may be caught by a means to absorb or contain seepage.

In accordance with yet another aspect of the present invention therefore that is provided a seepage container comprising a lower compartment having an open lower end for receiving the upper end regions of the one or more edible enclosing tubes of a food product according to the present invention and a closed upper compartment, the upper and lower compartments being divided from one another by a perforated internal wall; the arrangement being such that when the seepage container is fitted to the upper ends of the one or more edible enclosing tubes and the food product is inverted, any liquid seeping from the food product runs into the upper compartment through the perforated internal wall where it is kept separate from the food product.

In some embodiments, a removable seepage container may be fitted to the open upper end of the or at least one edible enclosing tube of the handheld food product of the present invention. In some embodiments, a single seepage container may be fitted over the open upper ends of a plurality of edible enclosing tubes.

In some embodiments, the seepage container may comprise two separate components that can be releasably fastened together, each of the components defining a respective one of the upper and lower compartments, one of the components defining the lower compartment and the internal wall, whereby the upper compartment can be detached from the lower compartment for accessing liquid received therein. This may be useful when the liquid seeped out from the food product during storage is tasty and may be consumed separately.

In an embodiment, the seepage container may consist of two contiguous tubular compartments sharing the same vertical cylindrical axis, whom the first tubular compartment is open on its external end, where the second tubular compartment is closed on its external end, where the curved surfaces of said two compartments may be closed and where the surface between said two tubular compartments may have numerous sieve-like perforations. The packaged food product with attached said seepage container may be inverted from its normal, vertical position for consumption and placed so that said seepage container lies below the open end of the packaged food product, allowing any excess moisture in the food product to drain downwards through the numerous perforations in the surface between said two compartments and be collected in the closed compartment, for subsequent removal. For consumption, said consumer packaging may be inverted so as to place said seepage container uppermost which may then be removed, leaving the top part food product visible again and ready to be eaten. Suitably, the upper compartment of the seepage container may comprise a drain and removal member closing the drain. Before righting the food product, a user may open the drain to allow liquid that has seeped out from the food product during storage into the upper compartment to be drained out of the seepage container before inverting the consumer packaging for consumption.

Assembled-in-Advance Crate

In the case that food products are assembled in advance of actual demand, and especially if they are transported from the place of preparation to the point of distribution, it is important for the food products to be held securely until final completion with their longitudinal axis in the vertical position and with said seepage container below the open end of the packaged food product, so as to catch any moisture exiting downwards from the fillings. An embodiment of equipment to hold securely food products assembled in advance may be provided by a crate consisting of an array of cells which may have the characteristics below:

Each cell may accommodate one food product assembled in advance.

The base of each cell may have a central cylindrical cavity with a vertical axis which may accommodate said closed chamber of said seepage container.

Above said central cylindrical cavity of each cell, the cell may have a square horizontal cross-section, whose size may allow the widest part of the packaging to fit next to the widest part of the packaging in adjacent cells of the crate.

The sides of the crate may be open, so as to give lateral access for loading and unloading the food products.

The crate may have vertical reinforcements on its corners, whose height above the floor of the crate extends slightly beyond the height of the packaged food product with any seepage means attached, so that filled crates can be stacked for transport without the base of an upper crate touching the packaged food products contained in a lower crate. In an embodiment, a padded mat may be accommodated over said packaged food products packed into a crate so that the crate stacked above it can exert a small degree of pressure on said food products below and help to keep them in place during transport.

System for Ordering Food Products

According to a different aspect of the present invention there is provided a system for ordering a food product in accordance with the invention which comprises providing a menu of a plurality of different fillings, providing a user input device for compiling and transmitting an order for a food product with one or more fillings selected from the menu; receiving the order at a remote location; making the food product with the selected fillings, fitting a seepage container and packing the food product in inverted orientation into a crate according to the present invention; transporting the crate to a point of delivery; removing the food product from the crate, removing the seepage container, righting the food product and removing the one or more filling storage tubes; delivering the food product. In some embodiments, the system may comprise beating the food product immediately prior to delivery and/or adding a sauce and/or one or more toppings to the one or more edible fillings at the open upper ends of the one or more edible enclosing tubes.

In yet another aspect of the invention there is provided a system for making a food product according to the present invention comprising receiving an order for a food product with one or more fillings selected from a menu; making the food product with the selected fillings, fitting a seepage container and packing the food product in inverted orientation into a crate according to the present invention; and dispatching the crate for transportation to a point of delivery.

DETAILED DESCRIPTION OF PREFERRED EMBODIMENTS OF THE INVENTION

Embodiments of the invention provide techniques for creating and using a gourmet fast food. The fast foods described herein are exemplary, however, and not limiting of the invention as other implementations in accordance with the disclosure are possible.

Finished Food Product

Figure 1:
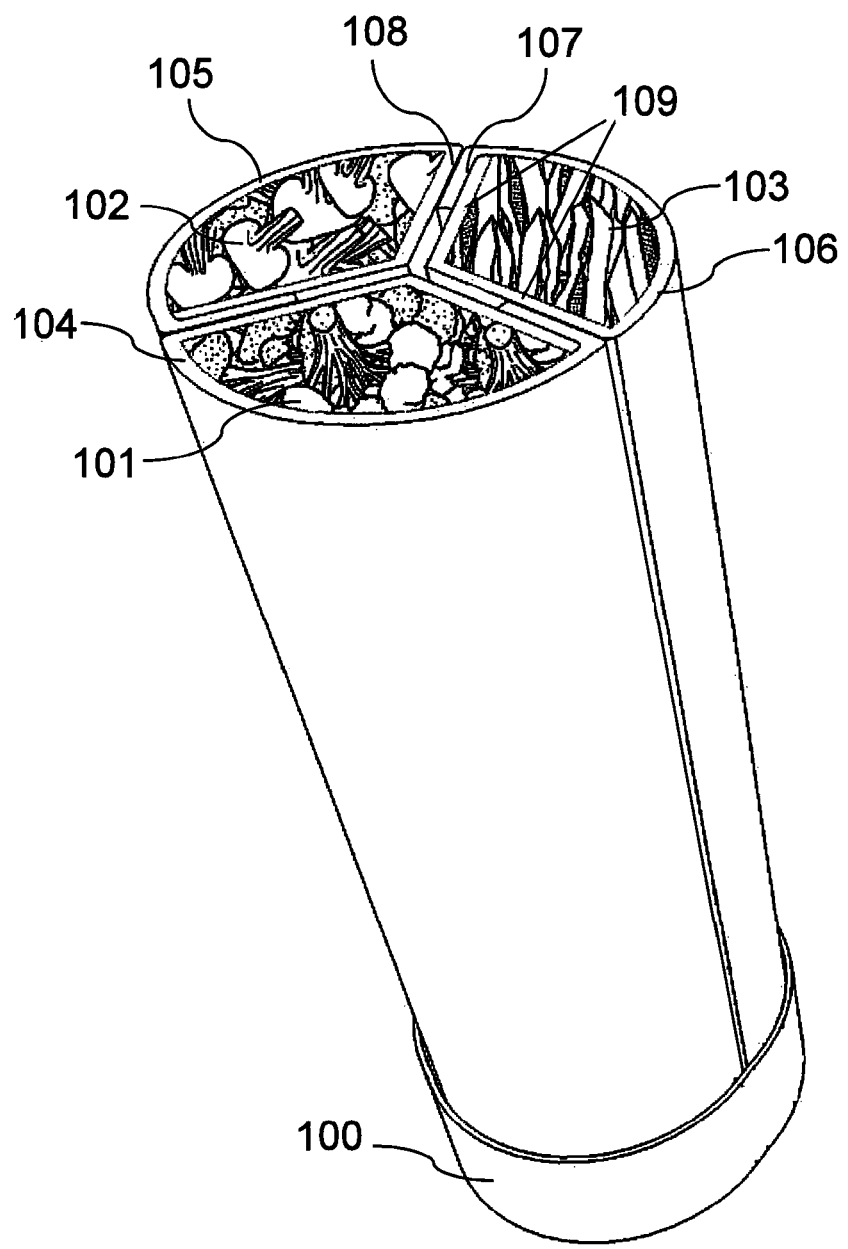
FIG. 1 is a perspective view of a gourmet fast food and base receptacle.

Referring to FIG. 1, a preferred embodiment of the individual handheld food product of the present invention consists of a set of three edible fillings 101, 102, 103 contained in edible enclosing tubes 104, 105, 106, where each enclosed filling has a cross-sectional area of a third of a circle. The three enclosed fillings, juxtaposed so that the walls of their edible enclosing tubes are contiguous, such as 107 touching 108, approximately form together a cylindrical food product. The lower ends of the set of three enclosed fillings are placed in the cavity of an open, base receptacle 100. A preferred embodiment offering an adult serving may have the height of the cylindrical food product equal to 15 cm and the radii of the cross-sectional circle sector of each filling, such as 109, may be 2.85 cm. In another embodiment, the height of the cylindrical food product may be about 10 cm and the radii of the mass-sectional circle sector of each filling, such as 109, may be about 3.5 cm. Other embodiments may have different dimensions for the food product height and for the radii, such as 109, of the cross-sectional area of the enclosed filling. A child's embodiment may have smaller radii of the cross-sectional circle sector of enclosed fillings which are easier for a child to bite into and which give a narrower cylindrical product which a child can more easily hold in his hand. The smaller dimensions of the child's embodiment can be achieved through having proportionally smaller filling storage tubes and edible enclosing rectangles relative to the adult sizes.

Further embodiments may have a different number of elements in the set of enclosed filings. For example, a sampling version for consumers to taste the edible fillings may contain a set of six enclosed filings, where the filling portion has a cross-sectional area of a sixth of a circle whose radius may measure 2.5 cm. The height of the sample product may be, for example, 5 cm.

Figure 2:
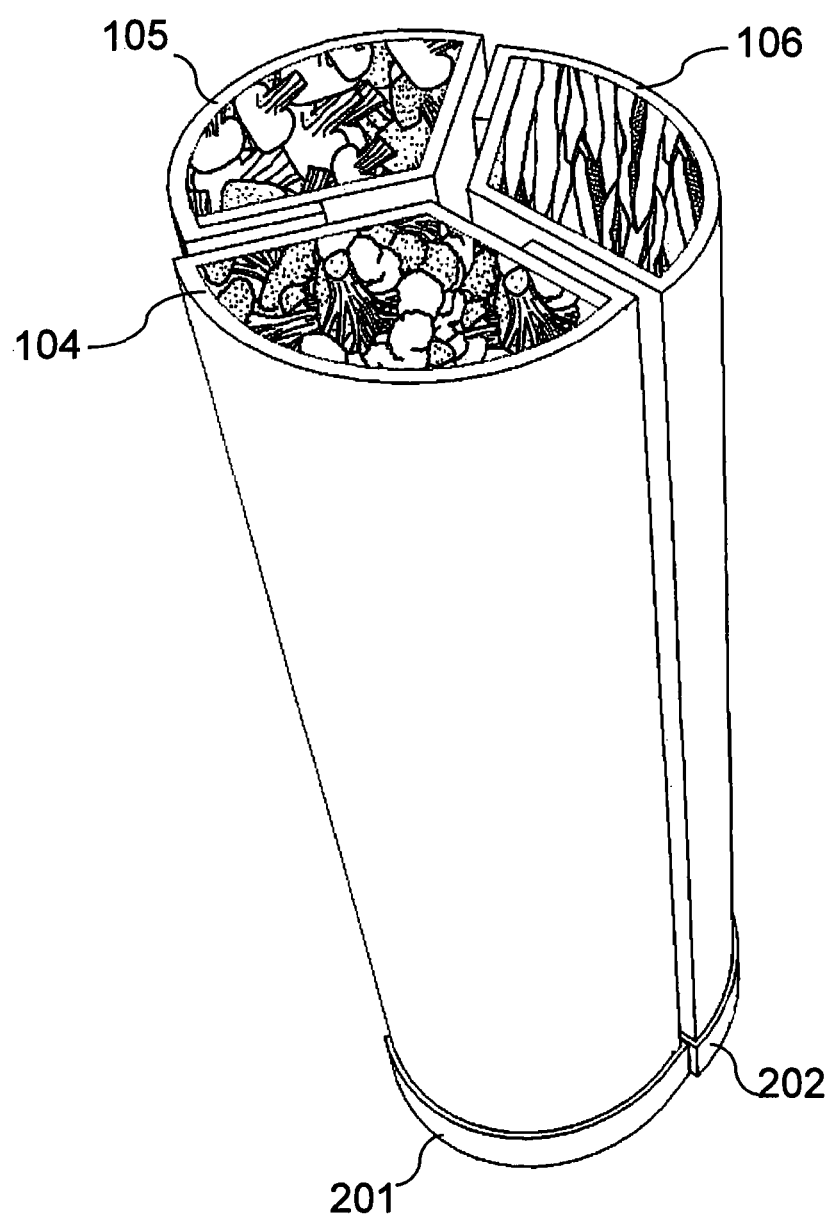
FIG. 2 is a perspective view of a gourmet fast food with a base receptacle under each enclosed filling.

In a further embodiment, a separate base receptacle may be placed under the lower end of each enclosed filling, such as base receptacles 201, 202 under enclosed fillings 104, 106, shown in FIG. 2. It will also be seen in the embodiment of FIG. 2 that each base receptacle 201, 202 forms a snug interference fit around the lower end of its respective enclosing tube 104, 105, 106.

Base Receptacle

Figure 3:
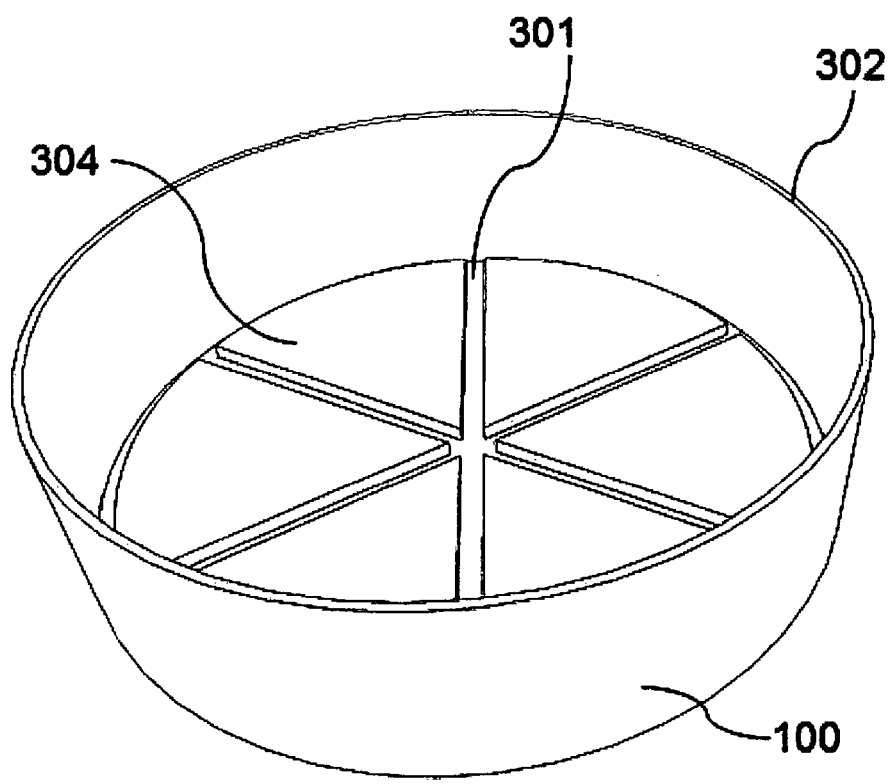
FIG. 3 is a perspective view of a base receptacle covered by an edible retaining layer, constituted of individual segments.

A preferred embodiment of the auxiliary support for a preferred embodiment of the food product is shown in FIG. 3, where the circular bottom 301 may have diameter that is selected such that the end of the food product forms a close friction fit inside the bottom perimeter of the base receptacle, whereby the auxiliary support cap the end of the enclosing tube that is inhibited from becoming detached under gravity.

The top, circular rim 302 of the base receptacle has a slightly larger diameter than that of the bottom of the base receptacle, so that the peripheral wall of the receptacle, which may be 2.5 cm high, progressively widens as it rises above the bottom of the receptacle, enabling base receptacles to be nested when in storage before use with the food product.

In a preferred embodiment, the base receptacle is made from paper using standard technology for producing paper cups. The basis weight of the paper may suitably be 170-350 $g/m^2$, e.g. 250 $g/m^2$. The same technology used for paper cups may be applied to seal the seams of the wall and the foundation of the receptacle and the paper of the base receptacle may be coated with a very thin layer of food safe polyethylene to retain any residual juices or humid residual morsels from the filling.

In an alternative embodiment, the base receptacle under the set of enclosed fillings or under individual enclosed fillings is made from an edible material. This has the advantage that the base receptacle and the residual filling that it contains can be eaten together instead of scooping the residual filling out of the receptacle. An edible base receptacle may be made from unleavened dough having 5 to 7% oil content by weight, which can be baked to a crunchy consistency, resistant to moisture.

Edible Retaining Layer

In a preferred embodiment of the food product, the surface of the base receptacle which supports the lower ends of the enclosed fillings is overlaid with an edible retaining layer, suitably a layer of savory crackers 304, as shown in FIG. 3, where the cross-section of each cracker is a circle sector such that two crackers can approximately fit under each enclosed filling. Each cracker can be used to scoop up filling which has fallen into the base receptacle, especially the filling which has fallen directly onto a cracker, simplifying eating of the last morsels of the food product at the end of its consumption.

The crackers may be made of a dough, comprising, for example, flour, water, margarine, approximately 1-1.5% by weight of crushed aromatic seeds, e.g. cumin, and other additives. The dough may be prepared by known processes for producing crackers. The crackers may be baked for 8 to 15 minutes in an oven at a temperature of about 150-220° C., e.g., 200° C. (approximately 400° F.).

Edible Filings

A set of edible fillings for the food product corresponding to the main course of a meal may comprise a selection of vegetables and a component rich in protein, such as meat, poultry, fish or tofu. For a dessert a set of edible fillings may comprise items such as ice-cream, chocolate mousse and fruit-based foodstuffs. The contents of current fast food products may often be simple foodstuffs, such as a beef patty, cheese, pickles, onions and lettuce, whereas the food product may offer edible fillings which may be comparable to refined restaurant dishes because the filling storage tube of the present invention can hold stably together, within closed walls and sealed ends, the constituents of even elaborate preparations.

Filing Storage Tube

Figure 4:
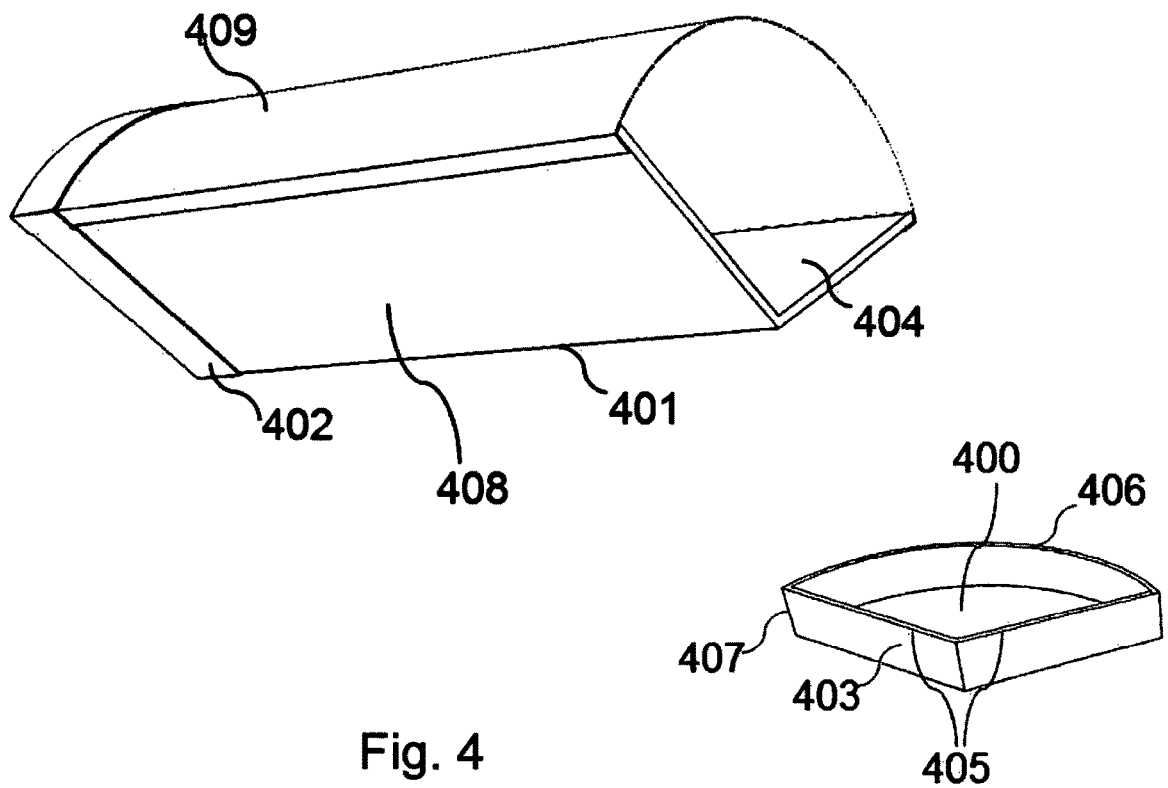
FIG. 4 is a perspective view of a filling storage tube and cap.

Bach edible enclosing tube which makes up the food product may easily be formed by winding an edible enclosing sheet around a filling storage tube. For a preferred embodiment of the food product shown in FIG. 1, a preferred embodiment of the filling storage tube is shown in FIG. 4, where the cross-section 400 of this tube is the circle sector which corresponds to the cross-sections of enclosed fillings 101, 102, 103 shown in FIG. 1 and where the length 401 of the filling storage tube corresponds to the height of the food product. In this preferred embodiment of the filling storage tube, its walls are in two parts, as shown attached together in the cross-sectional view of FIG. 5 and as shown separated in the perspective view of FIG. 6. Referring to the cross-sectional view of FIG. 5, the form of the ross-section of one component 408 of the filling storage tube is the V-shape formed by the two radii delimiting a circle sector and the form of the cross-section of the second component 409 of the filling storage tube is the arc of the circle sector centered on the vertex 505, with each end of this arc terminating in a section 504 which extends radially from the ends of this are in the direction of the vertex subtended by the arc, where the end sections 504 wrap around the V-shaped form 408 and press the two components of the filing storage tube walls together.

The preferred embodiment of the filling storage tube is sealed at each end of the tube. In an embodiment, the ends are sealed using caps such as 402, 403 shown in FIG. 4, the caps, for example, may be 1 mm thick with the height of the cap 407 covering the walls of the filling storage tube over 8 mm, and with the interior of each cap having the same cross-section as the exterior of the tube and made of a material such as a food-safe silicone rubber compound with a Shore hardness of 40A, having the elasticity to clamp the ends of the two component walls of the filling storage tube. Moisture seeping out of the storage tube is limited by the cross-sectional area of the caps 400, as shown in FIG. 4, exerting inward pressure on the edible filling at the ends of the filling storage tubes over the cross-sectional area 501, as shown in FIG. 5, and through elasticity of the caps enabling good adherence of the inside of the caps to the exteriors of the tube walls near the ends of the filling storage tube.

In an alternative embodiment, the ends of the filling storage tube may be sealed by a capping entity made of food grade shrink film, which is shrink-wrapped over each end of the tube and over the walls of the tube adjacent to each end. As well known to those skilled in the art of shrink packaging, appropriate characteristics of such a shrink film capping entity for the filling storage tube include sealing strength and tear resistance, as well as, to assist the rapid stripping of the capping entity from the surface of the filling storage tube that it covers, the ability to be easily cut and the incorporation of features such as tape, string or intermittent perforations. If it is judged useful to allow any excess moisture to drain out of the filling whilst it is still in the filling storage tube, the shrink film across the open end of the tube can be perforated.

Figure 5:
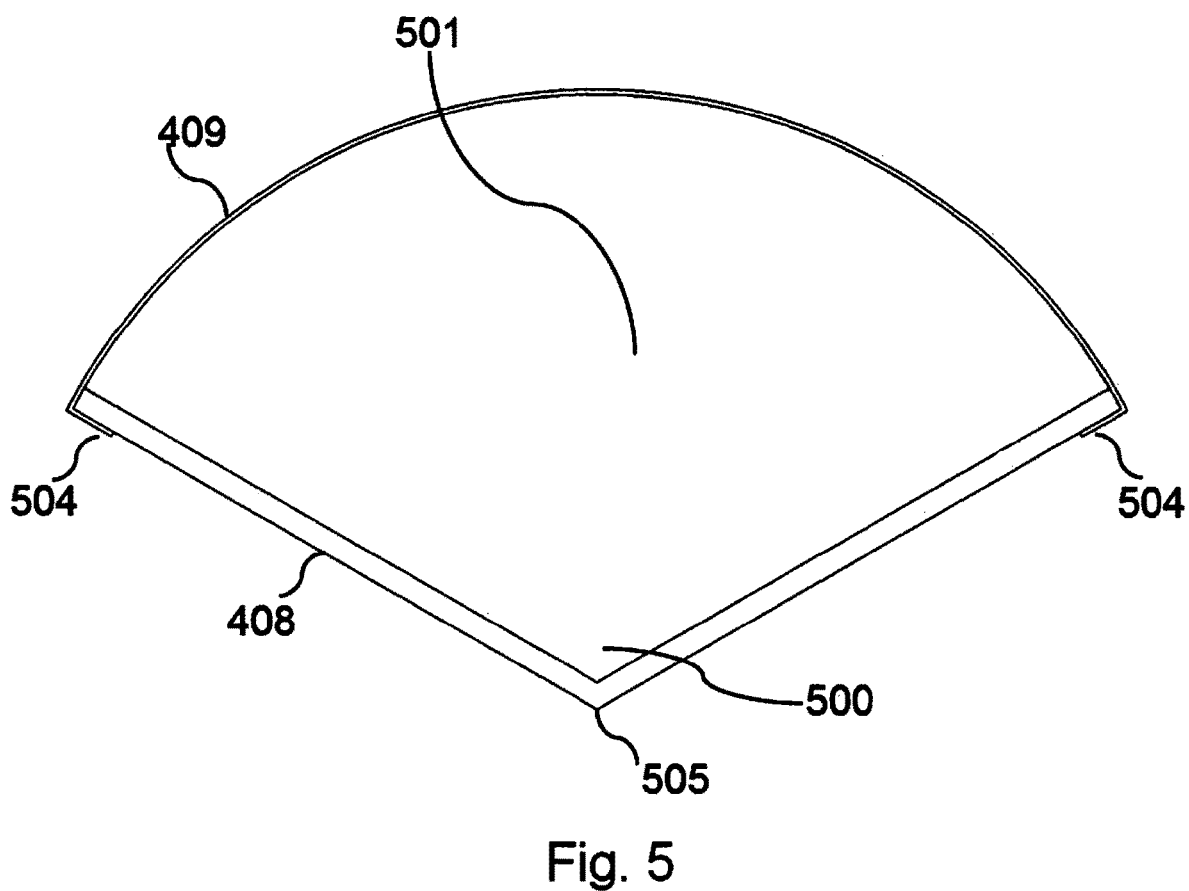
FIG. 5 is a cross-sectional view of a filling storage tube.

For a preferred embodiment of the food product consisting of three enclosed fillings, the cross-sectional view of FIG. 5 shows the central angle 500 of the cross-section of the filing storage tube as having 120 degrees. In alternative embodiments, central angles other than 120 degrees can be implemented. For example, in order to have a set of four enclosed filings in the food product, the central angles may be 90 degrees. Furthermore, in alternative embodiments, the central angles in a set of filling storage tubes composing a food product can be different from one another, although the sum of the angles needs to be 360 degrees. For example, to reduce the proportion of meat in the product, the meat storage tube could have the central angle less than 120 degrees and the central angles of remaining tubes for vegetable fillings each have correspondingly wider angles, so that the total of the central angles sums up to 360 degrees.

Referring to FIGS. 4 and 5, in a preferred embodiment, the wall of the filling storage tube component 408 having a V-shaped cross-section may be moderately rigid, giving stability to the storage tube. An embodiment of this filling storage tube component 408 may be made of high density polyethylene and each arm of the V-shape cross-section of its wall may be of length 2.85 cm and of thickness 1 mm. An embodiment of the component 409 having a cross-section in the form of an arc with end segments 504 may be made of polyethylene terephthalate and its wall may have a thickness of 0.2 mm, so that the elasticity of this configuration of the component 409 enables its end sections 504 to snap over the over the more rigid component 408 having a V-shaped cross-section, as shown in FIG. 5, with the result that these two components may hold together without needing any further clamping device.

Where the use of deep-frozen fillings is appropriate, filling storage tubes are advantageous, since the small cross-sectional area of the tubes can result in rapid defrosting. Before deep-freezing a filling storage tube, it is advisable to shrink-wrap the tube in freezer safe and puncture resistant shrink wrap film, which also caps the ends of the tube, so as to resist the outward pressure n the components of the tube due to any expansion of the frozen filling and it is also important to leave enough empty space inside the tube to accommodate any increase in volume of the filling after freezing.

Preparing the Filling Storage Tube

Referring to FIG. 4, to prepare the filling storage tube, a capping entity, such as the cap 402, may be placed on one end of the filling storage tube 408 and the tube may be held vertically with the open end of the tube upwards. The filling storage tube may be loaded from a hopper containing the filling and the contents of the storage tube may be pushed down so as to be moderately compressed within the tube. Additional filling may be inserted into the top of the tube with this additional filling in turn being compressed and the steps of filling and compression may be repeated until the filling storage tube is well packed with filling up to its rim. The top end of the filling storage tube may then be closed by a second capping entity, such as the cap 403.

In an alternative filling procedure, the contents of the filling storage tube may come from more than one source, each having a different type of filled, which may be used successively to load the filling storage tube, so that the types of foodstuffs in the filling storage tube vary along its length.

Figure 6:
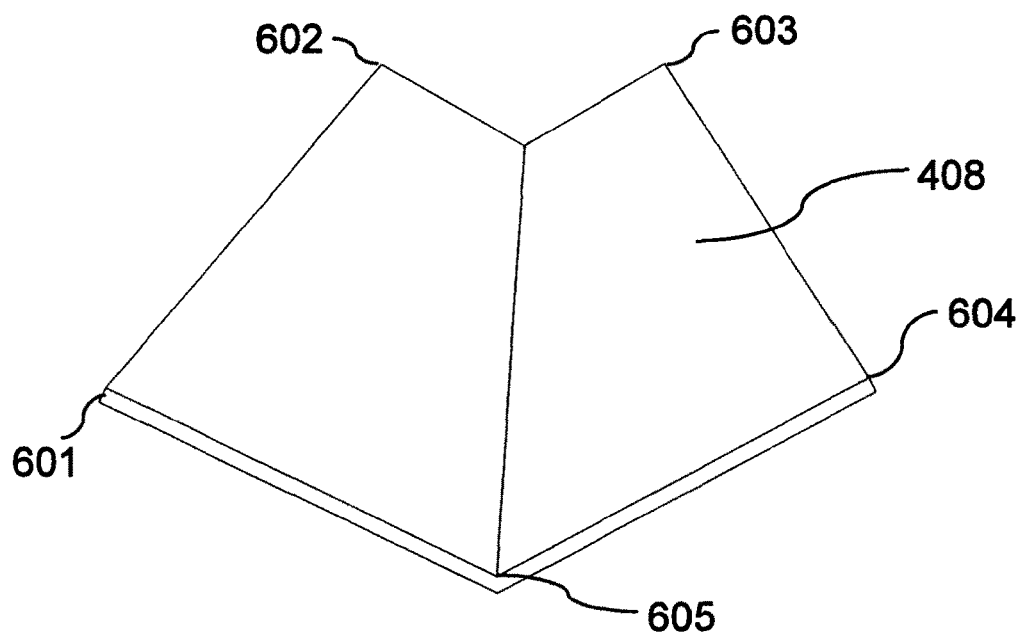
FIG. 6 is a perspective view of components of a filing storage tube.
Figure 6:
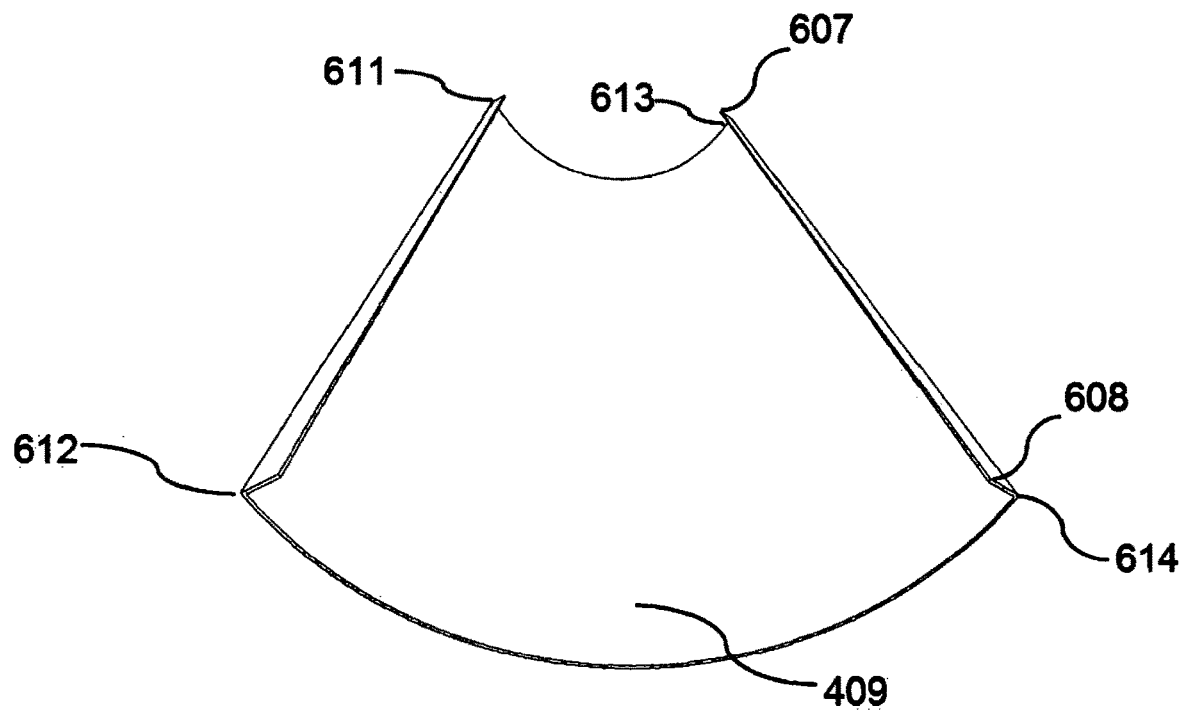
Figure 7:
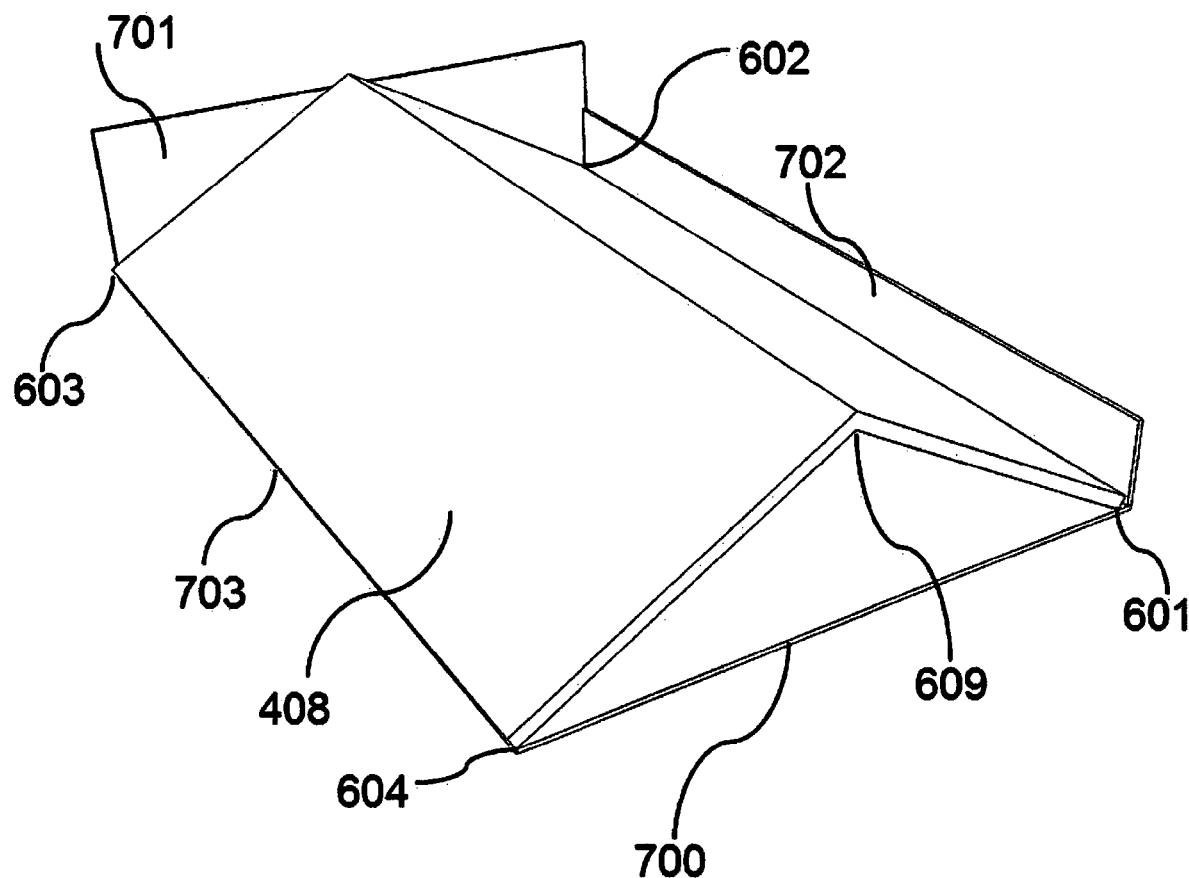
FIG. 7 is a perspective view of a cover to assist loading a filling storage tube.

In a further alternative filling procedure, each component of the filling storage tube may be positioned separately with its length horizontal, as shown in FIG. 6, and be loaded in turn. This positioning gives full access to the volume delimited by each component and makes it easier to place different foodstuffs in diverse positions on each component, if wished, to give elaborate variation in the filling of color, texture and taste, according to preferences. A cover may next be placed over the open cross-sectional area of one of the components, such as over the plane specified by the points 601, 602, 603, 604 of the component 408 shown in FIG. 6. The covered component may then inverted, so that the cover 700, as shown in FIG. 7, supports the filling enclosed by the component 408 and the cover 700, with the two flaps 701, 702 of the cover anchoring the component 408 so that it stays in place. The component of the filling storage tube 408 with its cover, as shown in FIG. 7, may be placed over its accompanying component 409, as shown in FIG. 6, aligning the edge 703 of the cover with the edge 611, 612 of the filling storage tube component 409, and stretching the flap 607, 608, 614, 613 away from the main surface of the component 409 so that it can be clamped over the flap 702 of the cover 700, shown in FIG. 7. Referring to FIG. 7, in order to leave the two components clamped together alone, the cover 700 may be slid out from between the components 408 and 409 of the filling storage tube, since the plane 601, 605, 604 of the filling storage tube component is not closed off by the cover 700. A capping entity, such as the cap 402 shown in FIG. 4, may be fastened over one end of the filling storage tube to close the latter. Further filling may then be pushed into the filling storage tube through the open end 404, shown in FIG. 4, until the filling storage tube is well packed and full. The filling storage tube may then be closed completely by fastening the second capping entity, such as cap 403 shown in FIG. 4, over the still open end of the filling storage tube.

Edible Enclosing Sheet

In a preferred embodiment, the edible enclosing sheet is typically made of a dough, comprising flour, water, vegetable oil and additives. The dough may be prepared by known processes for producing pliant bread.

The dough is rolled manually or by machine to form a flat sheet, which may have a thickness of 0.3-7 mm, and in a preferred embodiment 2 mm. Once rolled flat, the dough may be pricked extensively to prevent excessive puffing on baking. In an embodiment, rectangular shapes having a length of 12-30 cm and a width of 6-15 cm may be cut in the flat sheet to form the edible enclosing sheets. In a preferred embodiment, a rectangle having a length dimension of 16.7 cm and a width of 15.5 cm is cut in the rolled dough to form an edible enclosing sheet, which may give after baking an edible enclosing sheet having a length of 15 cm and a width of 14 cm.

In an embodiment, the formed dough sheet is deep frozen if it is wished to proceed with the constitution of the fast food product at a later point in time. When needed, the deep frozen sheets can be advantageously defrosted in about 1 minute at room temperature, due to their thinness, before proceeding with the next step.

The edible enclosing sheet can be baked. In an embodiment, this follows known processes for pliant bread, being "dry fried", that is fried without oil, over medium eat for about 1 minute per side, until the dough sheet is puffed and flecked with brown spots. In an embodiment, the baked edible enclosing sheet is then deep frozen and subsequently defrosted when needed.

Edible Enclosing Tube

Figure 8:
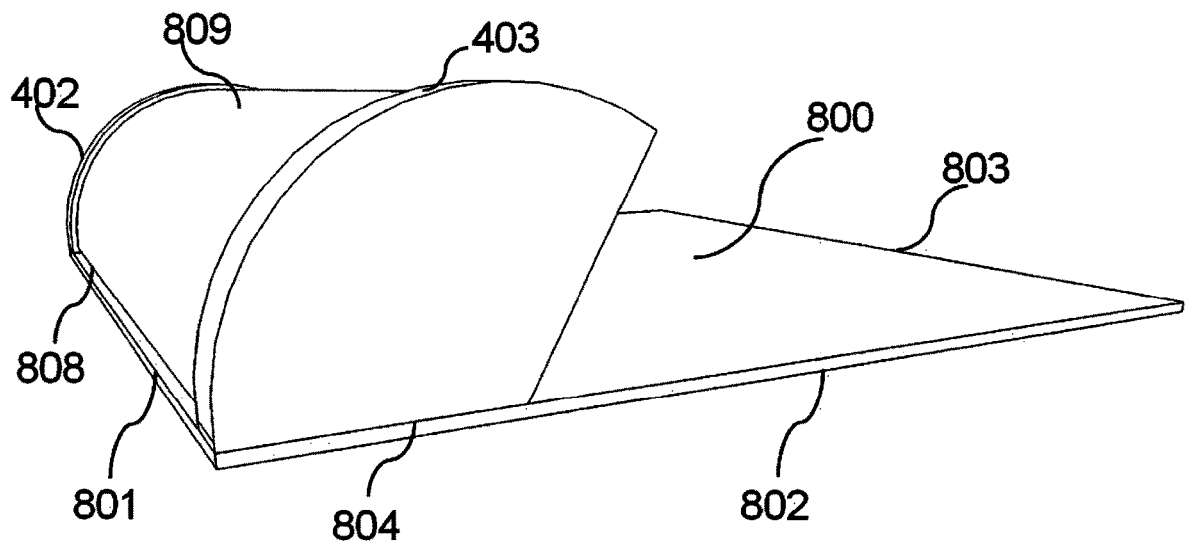
FIG. 8 is a perspective view of a filling storage tube on an edible enclosing sheet.

Referring to FIG. 8, in a preferred embodiment, the dimension 802 of the baked edible enclosing sheet 800 used to form the edible enclosing tube may equal the perimeter of the circle sector cross-section of the filling storage tube 809 incremented by between 30% or 50% to 90% of the length of the radius of this circle sector cross-section.

Figure 9:
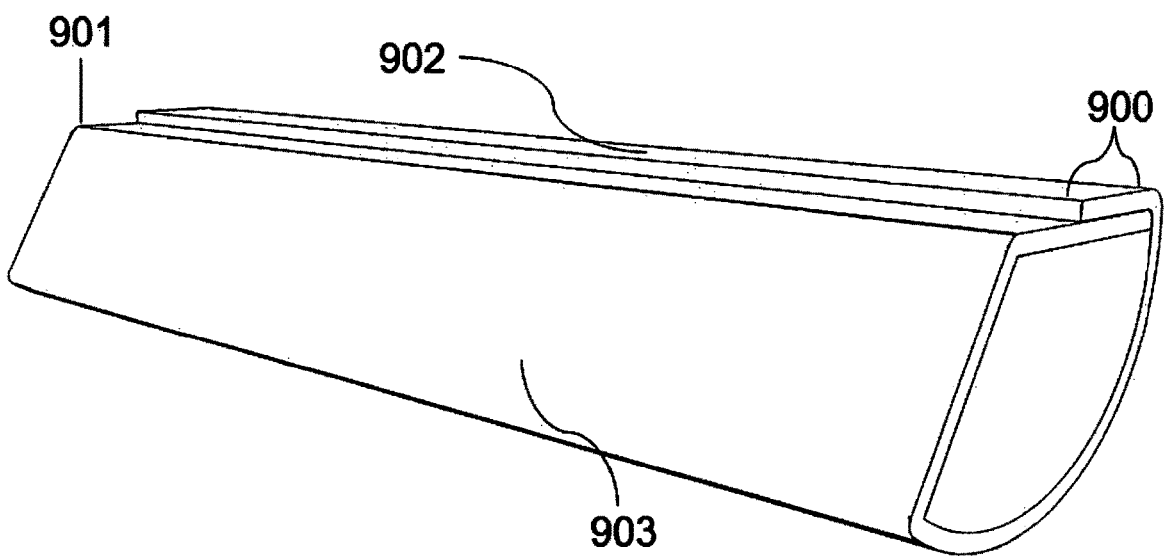
FIG. 9 is a perspective view of a wrapped filling storage tube.

The edible enclosing tube may be formed by placing a filling storage tube 809 with one of its fat faces on the edible enclosing sheet 800, so that a straight edge 808 of the filling storage tube lies adjacent and substantially parallel to a straight edge 801 along the width of the edible enclosing sheet 800, both edges 808 and 801 having the same length, then rotating together the filling storage tube 809 and the edible enclosing sheet 800 in the direction substantially parallel to the straight edge 802 of the edible enclosing sheet. As the edible enclosing sheet 800 and the filling storage tube 809 are rotated together, the end 803 of the edible closing sheet may be gently stretched away from the already rotated combination, so that the edible closing sheet remains taut, thus ensuring that the edible closing sheet fits tightly around the filling storage tube. The rotation of the edible enclosing sheet 800 and the filling storage tube 809 is continued until the edible enclosing sheet 800 not only wraps completely around the filling storage tube but also overlaps on itself, closing the resulting tube across one of its straight walls. An example of such closure is shown in FIG. 9, whom the overlap occurs across the section 900, to form the illustrated edible enclosing tube. As FIG. 1 shows for a set of edible enclosing tubes in a food product, by closing an edible enclosing tube over its straight wall, the closing flap, for example 107, is prevented from opening by the contiguous straight wall, for example 108, of the adjacent edible enclosing tube.

Figure 10:
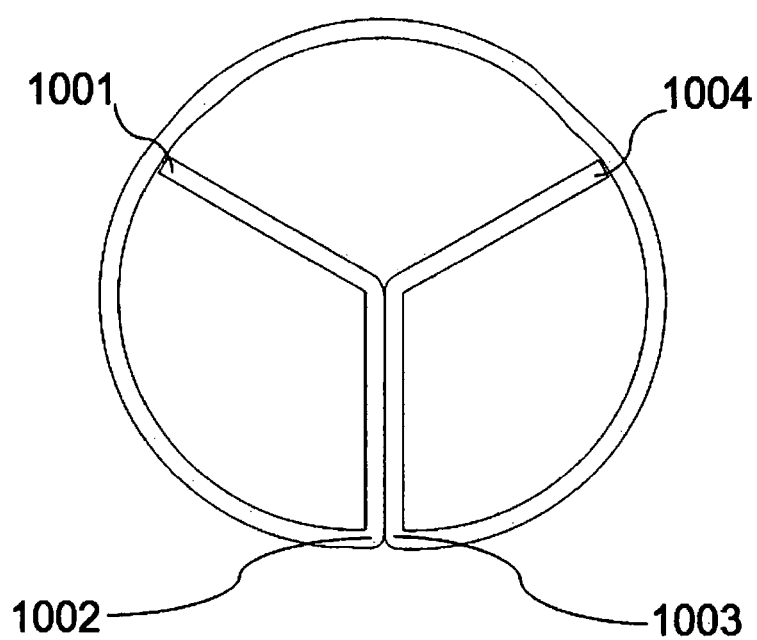
FIG. 10 is a plan view of a single edible enclosing sheet threaded between and around fillings composing a set.

Referring to FIG. 10, in an alternative embodiment of the set of enclosed fillings for the food product, the edible enclosing tubes have walls in common, which can be shaped by wrapping a single edible, rectangular sheet around the two straight walls of one filling storage tube, for example from positions 1001 to 1002, next around the exterior of the set of filling storage tubes, for example till position 1003 and lastly around the two straight walls of another filling storage tube, for example from positions 1003 to 1004.

Assembly Frame

Figure 11:
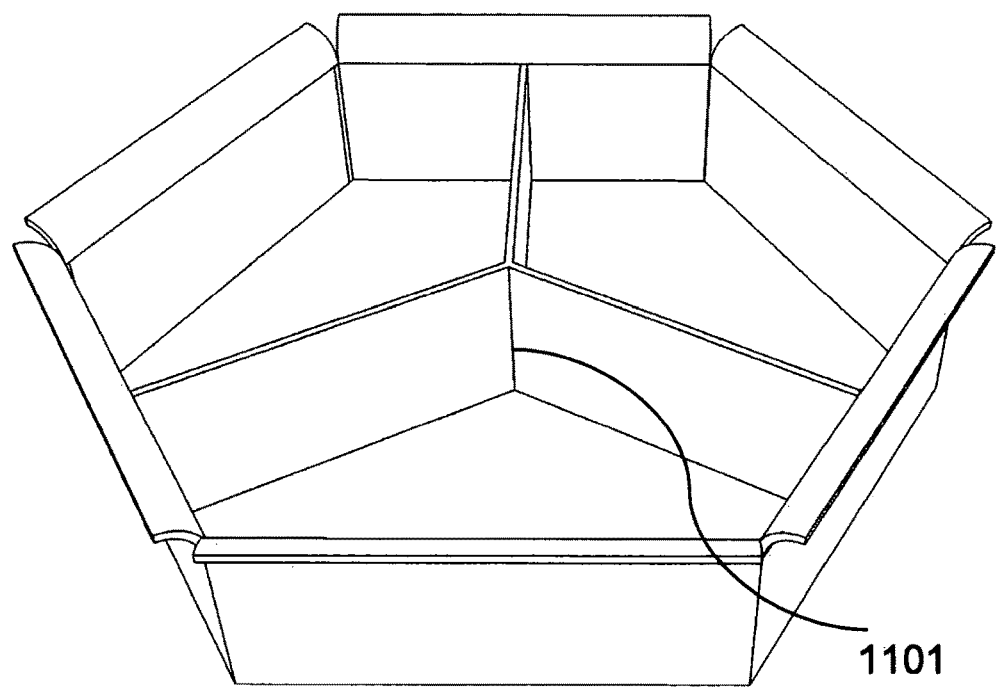
FIG. 11 is a perspective view of an empty assembly frame.

An assembly frame, such as shown in FIG. 11, facilitates the composition of a cylindrical set of enclosed fillings, such as shown in FIG. 1, during the assembly phase of the food product. The assembly frame may be composed of a set of compartments whose walls may be at right angles to a base to which they are attached, the base which may be a plane surface without any openings. To form the cylindrical set of enclosed fillings, a wrapped filling storage tube, such as shown in FIG. 9, may be placed into each compartment of the assembly frame, with the edge 901 of the wrapped filling storage tube which lies between the two flat sides 902, 903 placed as close as possible to an edge which lies at the center of a compartment of the assembly frame, such as the edge 1101 shown in FIG. 11. A plan view of an example of a filled assembly frame is shown in FIG. 12.

In a preferred embodiment, the top edges of the outside walls of the assembly frame are curved outward, as shown in FIG. 11, so as to guide the insertion of the edible enclosing tubes into the compartments of the assembly frame. When all the edible enclosing tubes in a set have been inserted into the assembly frame, the outside flap, such as 1209 shown in FIG. 12, of each edible enclosing tube is prevented from opening by pressure from the other adjacent tubes in the set.

When only part of the set of edible enclosing tubes has been inserted into the assembly frame, the assembly frame itself restricts the opening of the outside flap of the edible enclosing tube. The assembly frame clasps one end of each edible enclosing tube, for example over a length of about 2.5 an, with the rest of the length of the edible enclosing tubes projecting above the assembly frame, as shown in FIG. 13.

Figure 12:
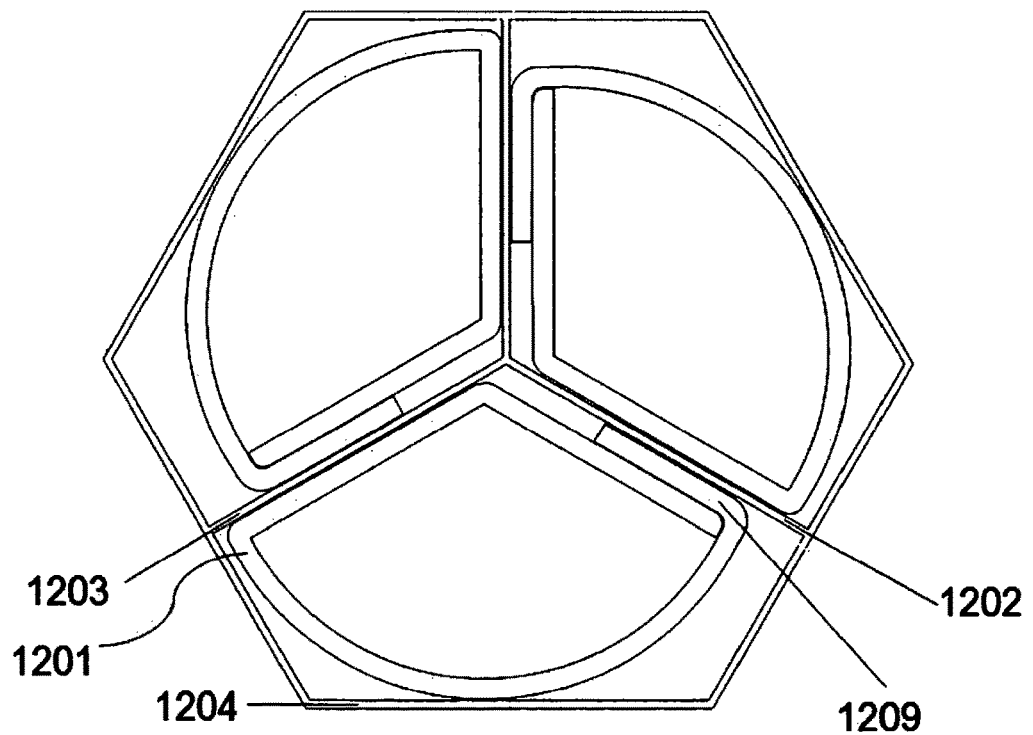
FIG. 12 is a plan view of an assembly frame, fully loaded with wrapped filling storage tubes.

For the end portion of an edible enclosing tube which is contact with the assembly frame, for example 1201 shown in FIG. 12, the outside flap 1209 is held in place by the wall 1202 of the assembly frame and the other sides of the edible enclosing tube are held in place by pressure from the walls 1203, 1204 of the assembly frame. The upper portion of the outside flap 1209 which falls above the top of the frame, as shown in FIG. 13, may open slightly in the absence of an adjacent edible enclosing tube during the assembly process of the set of edible enclosing tubes, but the angle of opening is minor even at the end of the edible enclosing tube which is distant from the assembly frame.

Figure 13:
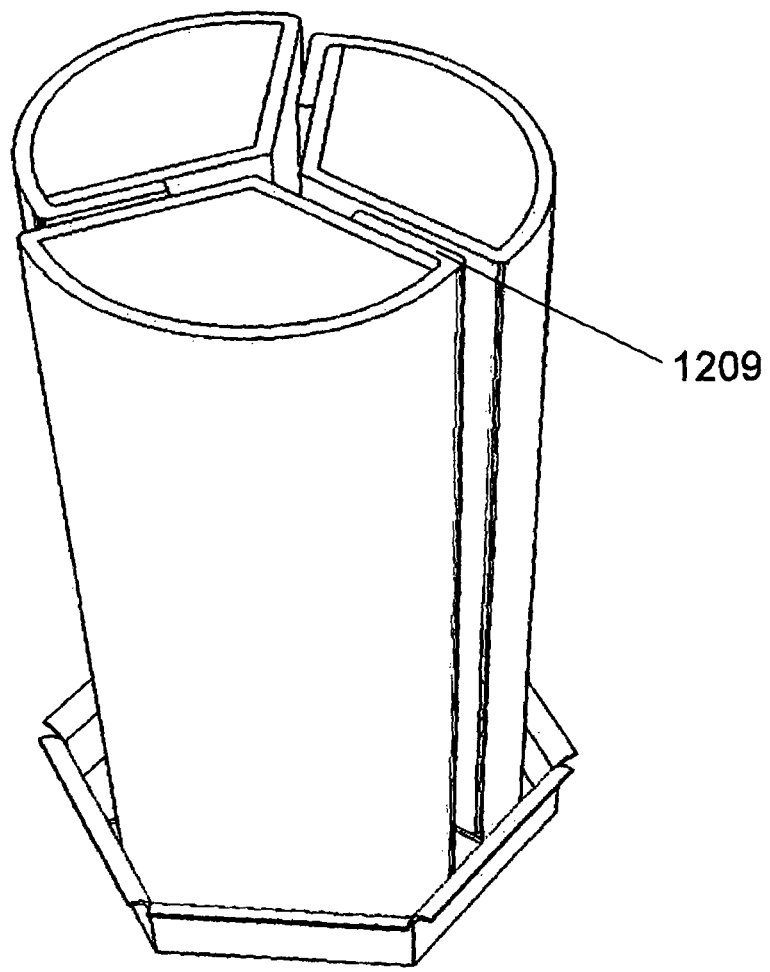
FIG. 13 is a perspective view of an assembly frame, fully loaded with wrapped filling storage tubes.

In a preferred embodiment offering an adult serving, the food product being prepared projects 12.5 cm above the assembly frame, as shown in FIG. 13, since the food product is 15 cm high and the height of the assembly frame is typically 2.5 cm.

Enclosed Filling

Figure 14:
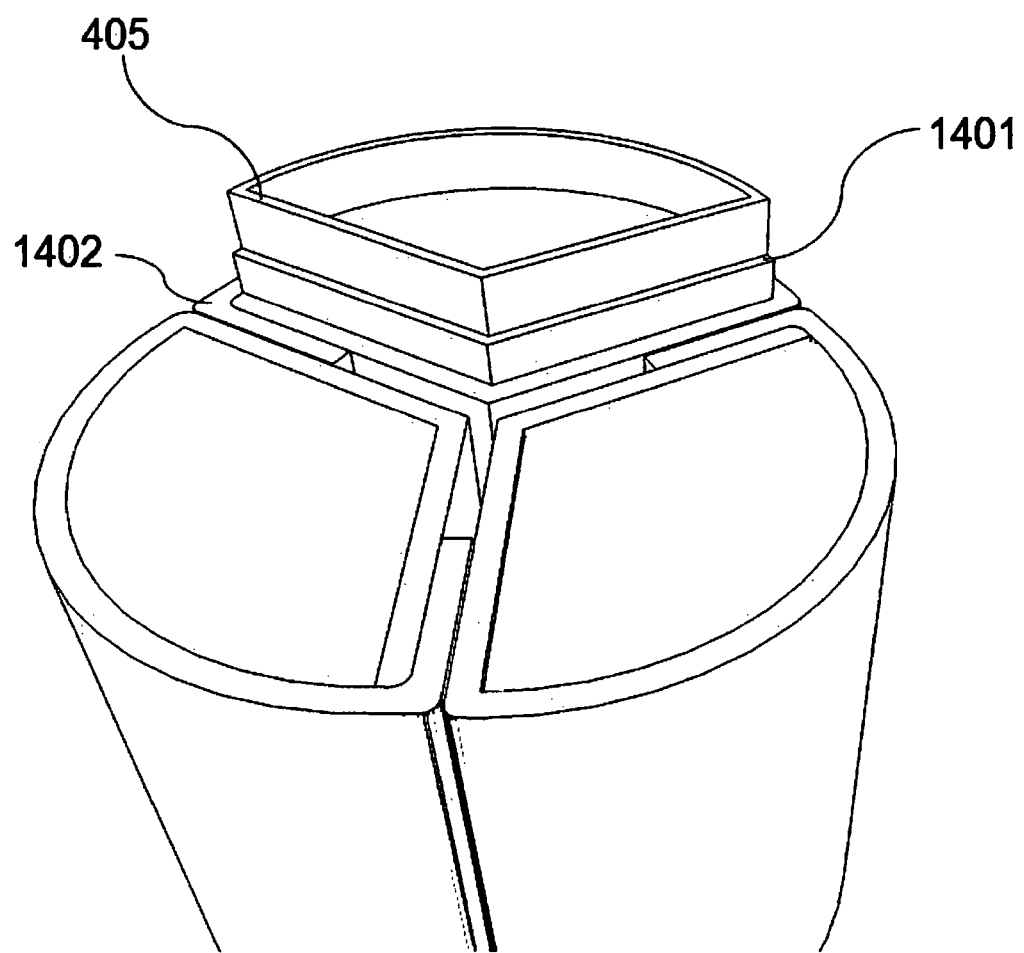
FIG. 14 is a perspective view of a wrapped filling storage tube being disassembled.

As described in detail later in this document in the section "Assembly Method", the enclosed filling of the preferred embodiment is formed by removing the capping entities from the filling storage tube and sliding out each component of the filling storage tube from between the edible enclosing tube and the filling inside the filling storage tube. Under normal circumstances, the components of the filling storage tube slide out from the filling without any filling remaining attached to their walls but if this is not the case, the edge of a covering, such as the cap 403 shown in FIG. 4, can be pressed against the wall being removed with the hollow part of the cap upward and the flat, outside top part of the cap towards the filling, so as to scrape off any filling from the wall as that wall is lifted out. For example, referring to FIG. 4, the curved edge 406 of cap 403 can be pressed against the wall of the curved component to be removed and in a different step, the V-shaped edges 405 of cap 403 can be pressed against the walls of the V-shaped component to be removed, this latter case being shown in FIG. 14, where the V-shaped edges 405 of the cap are pressed against the walls 1401, these walls being illustrated as already slightly lifted out from the surrounding edible tube, 1402.

Toppings

For a main course food product, suitable toppings may act as appetizers. Examples of such toppings are a savory crumble, a crunchy, well-seasoned, wheat snack or crisp-fried, flour-coated onions. For a dessert food product, toppings may be the traditionally served dessert toppings.

Sauces

Figure 15:
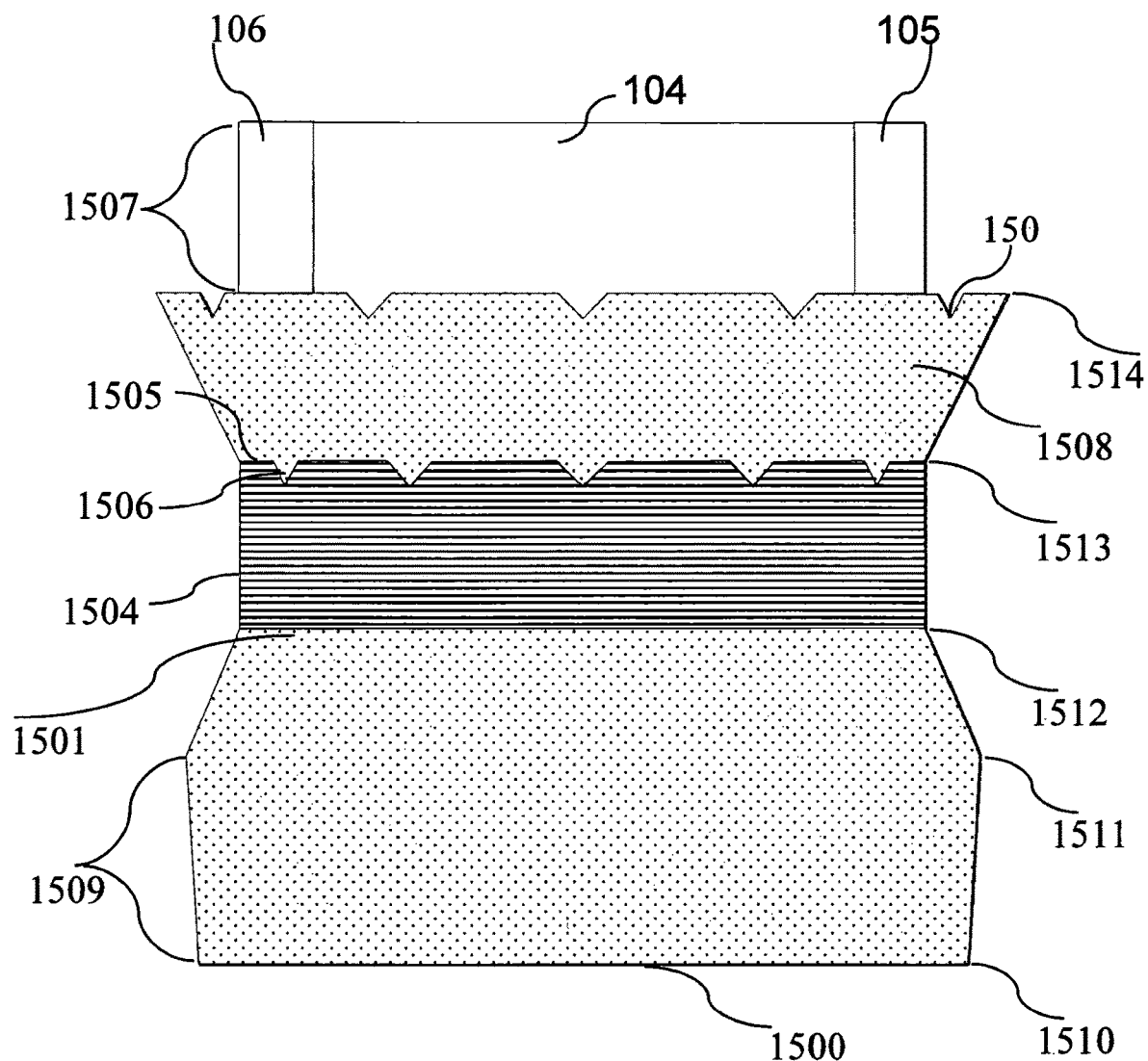
FIG. 15 is an elevation view of consumer packaging.

A sauce may be added to a filling using a marinade or seasoning injector, such as of stainless steel. The marinade needle of such an injector or injector gun may typically be up to 15 cm in length and have up to 12 holes along its length, at a plurality of positions on its circular cross-section, so that the marinade needle can be inserted into the enclosed filling, along its length axis, in order to inject the sauce uniformly within the filling Consumer Packaging The elevation diagram in FIG. 15 shows a preferred embodiment of consumer packaging which may comprise a round bottomed bag that contains the base receptacle in its lower section 1509, above which it contains the set of enclosed fillings 104, 105, 106, the top parts 1507 of which protrude from the consumer packaging. For example, in a preferred product embodiment offering an adult serving which may have a height of 15 cm, the packaging may leave approximately 2 cm at the top 1507 of the food product uncovered. In a preferred embodiment of the consumer packaging, the base receptacle may be integrated into the packaging such as by sticking the part of the packaging wall 1509 which overlaps the base receptacle to the receptacle's wall, this integration simplifying assembly of the food product, since it allows the base receptacle and the packaging to be placed together over the food product in a single action.

A band 1504, which may be of the same material as the consumer packaging, is fastened around the center of the consumer packaging to hold together the set of enclosed fillings, to attach the packaging firmly to the enclosed fillings, as well as to anchor the base receptacle inside the packaging under the enclosed fillings.

The contours of the preferred consumer packaging are determined by the following points. The slant of the packaging between levels 1510 and 1511 is due to the base receptacle situated underneath the packaging between these levels, the tapered shape of this receptacle allowing it to be nested when stocked. The cross-sectional width 1501 of the consumer packaging at level 1512 until level 1513 is determined by the cross-sectional width of the enclosed fillings which are gripped tightly underneath the band 1504. The difference in cross-sectional width of the consumer packaging between its top 1514 and its bottom 1510 is such that empty consumer packaging may be nested when stocked.

The length of the band 1504 is slightly longer than the circumference of the food product, so that after the band is wrapped around the center of the food product, the remainder of the band can overlap on the already wrapped portion of the band ad be stuck to it, preferably by a self-adhesive end to the band with a detachable tab covering the adhesive surface, to enable easy closure, as well as opening and closure again of the band to tighten its envelopment once the filling storage tubes have been disassembled to form the enclosed fillings. The breadth of the band 1504 may be, for example, 2 cm.

The paper used for the consumer packaging, for the band 1504 and for the bands used to attach the seepage container described below to the assembly, can be, for example, a light weight (25 to 30 gm/m$^2$) dry waxed deli paper, compliant with FDA regulations for food contact, which absorbs excess grease and oil while acting as a sanitary barrier for food and which holds up in moist conditions without failing apart spontaneously, though still easy to tear intentionally. The top rim 1514 of the consumer packaging and the top rim 1505 of the band 1504 may have a series of small v-shaped notches 1503, 1506, e.g. 12 notches around the rim, 3 mm deep and 6 mm wide, which make it easy for the wall of the packaging, as well as the band 1504, to be intentionally torn open by hand when the consumer wishes to bite on a part of the food product they cover.

The external underside 1500 of the consumer packaging, which in a preferred embodiment is reinforced by the base receptacle integrated into the packaging may be a flat surface which enables one or two fingers to be placed under the packaging to better support it whilst the remainder of the hand curves around the tubular part of the packaging.

Figure 16:
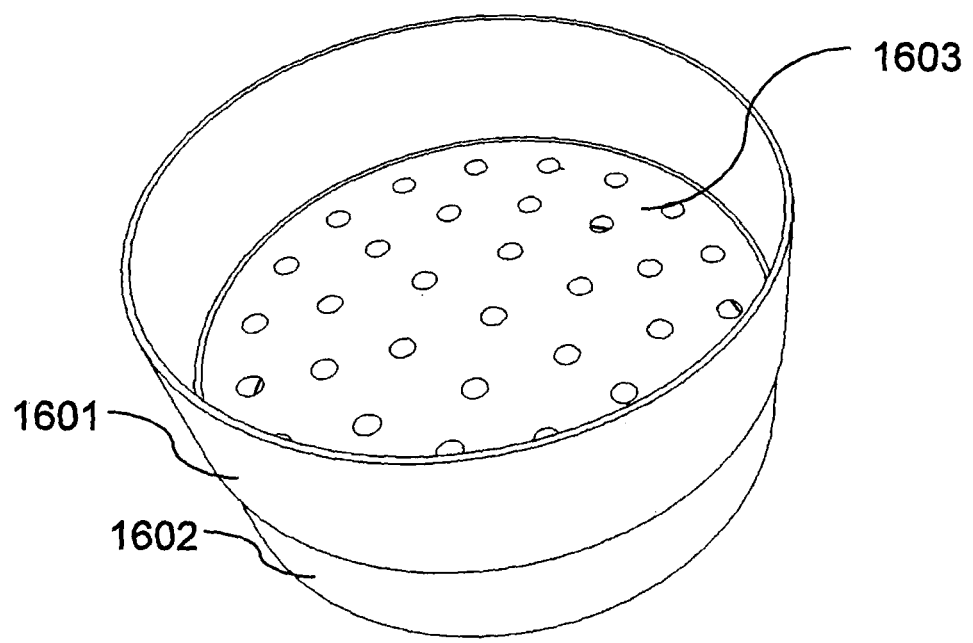
FIG. 16 gives top and bottom perspective views of a seepage container.
Figure 16:
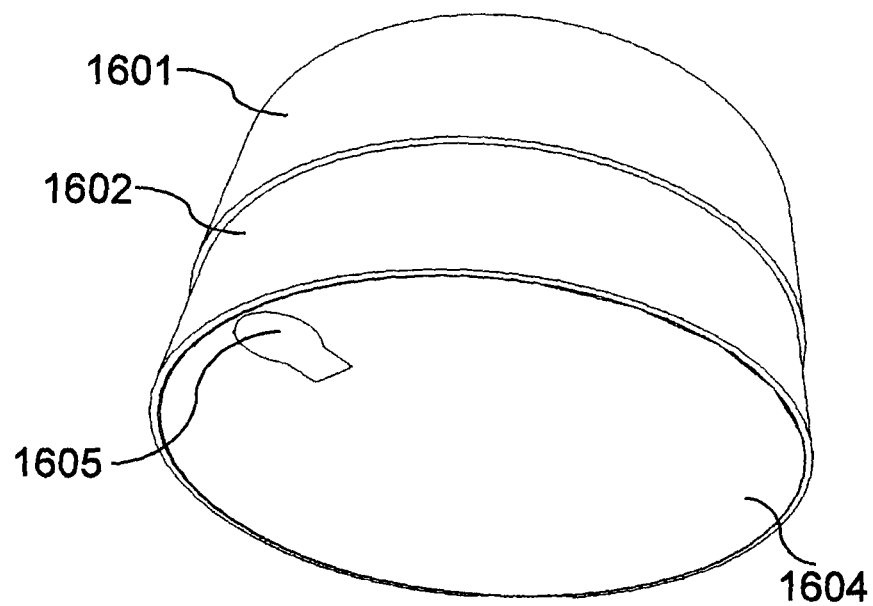

A disposable, small, plastic spoon, such as typically used for eating ice-cream from a tub, may be placed between the consumer packaging and the food product, with which residual morsels from the filling that fall into the base receptacle may more easily be finished. The length of the spoon is suitably placed substantially parallel to the longitudinal axis of the food product and with the end of the spoon touching the bottom of the base receptacle Seepage Container Referring to FIG. 16, an embodiment of the seepage container consists of two compartments where one tubular compartment 1601 is open on its external side and where a second tubular compartment 1602 is crossed on its external side 1604, with the two compartments being separated from each other by a surface 1603 pierced by a plurality of perforations. When the food product has been enveloped in its consumer packaging, the open side of the seepage compartment 1601 is placed over the exposed end 1507 of the food product, shown in FIG. 15, and within the skirt 1508 at the top of the consumer packaging. The compartment 1602 of the seepage container may have a removable tab which covers an evacuation orifice near an edge of the closed end of the compartment 1602, either on its curved wall or on its flat surface, for example the tab 1605 on the Rat surface 1604.

Figure 17:
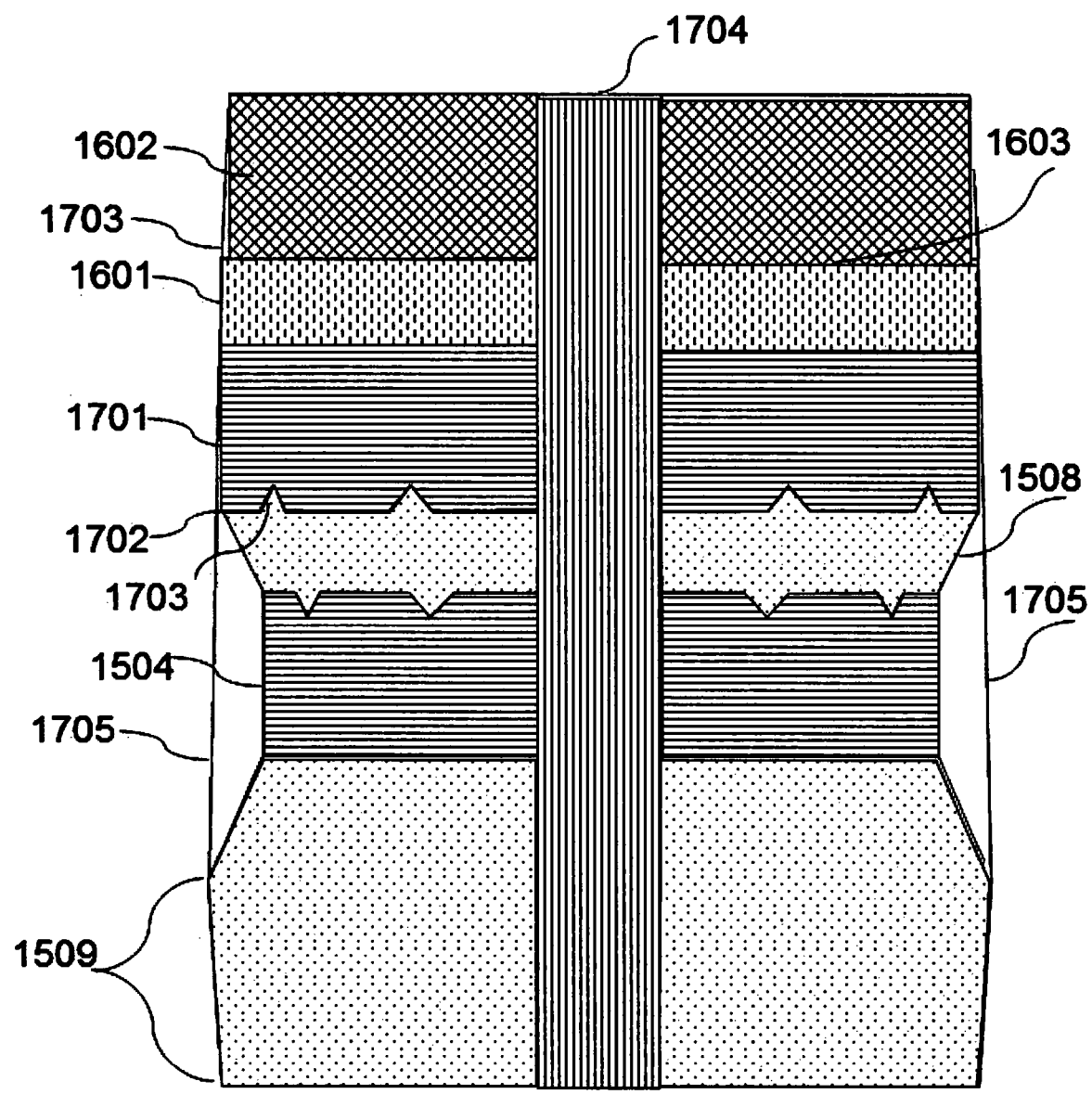
FIG. 17 is an elevation view of consumer packaging with a seepage container in place.

Referring to FIG. 17, the seepage container may be held in place over the food product and within the skirt of the consumer packaging by a band 1701 which is fastened over both the compartment 1601 of the seepage container and over the skirt 1508 at the top of the packaging, shown in FIG. 15. The rim 1702 of the band 1701 which falls over the skirt 1508 may have a series of small v-shaped notches 1703 around the rim which make it easy for the band 1701 to be intentionally tor open by hand, e.g. 12 notches, where each notch might be 3 mm deep and 6 mm wide. If an individual food product is to be transported, the seepage container may further be held in place by two identical bands 1704, 1705 which are attached over the packaging and the seepage container lengthwise, the two bands 1704, 1705 best following circuits around the perimeter of the assembly that at right angles to each other. As an example of the width of the bands used to attach the seepage container, 1701 might be 2 cm wide and 1704, 1705 might be 1.5 cm wide.

Referring to FIG. 17, in order to use the seepage container, the packaged food product with the attached seepage container 1601, 1602 may be inverted so that the compartment 1602 of the seepage container lies below the open end of the packaged food product, allowing any excess moisture in the food product to drain downwards through a plurality of perforations in the surface 1603 between the compartments. To remove the seepage container, the tab, for example 1605 shown in FIG. 16, should first be detached from the evacuation orifice at the bottom of the seepage container, and any moisture which has collected in the compartment 1602 should be emptied out. To facilitate these steps, the evacuation orifice at the end of compartment 1602 of the seepage container and the detachable tab covering the orifice, such as 1605 shown in FIG. 16, should not be covered by the bands 1704, 1705. The packaging may next be rotated back to its previous position with the seepage container 1601, 1602 uppermost, as shown in FIG. 17, allowing removal of the bands 1704, 1705 if present, then detachment of the band 1701, followed by removal of the seepage container without any risk of spillage of fillings, since the open ends of the enclosed fillings are uppermost, thereby leaving the food product, as shown in FIG. 15, ready to be completed for consumption.

Figure 18:
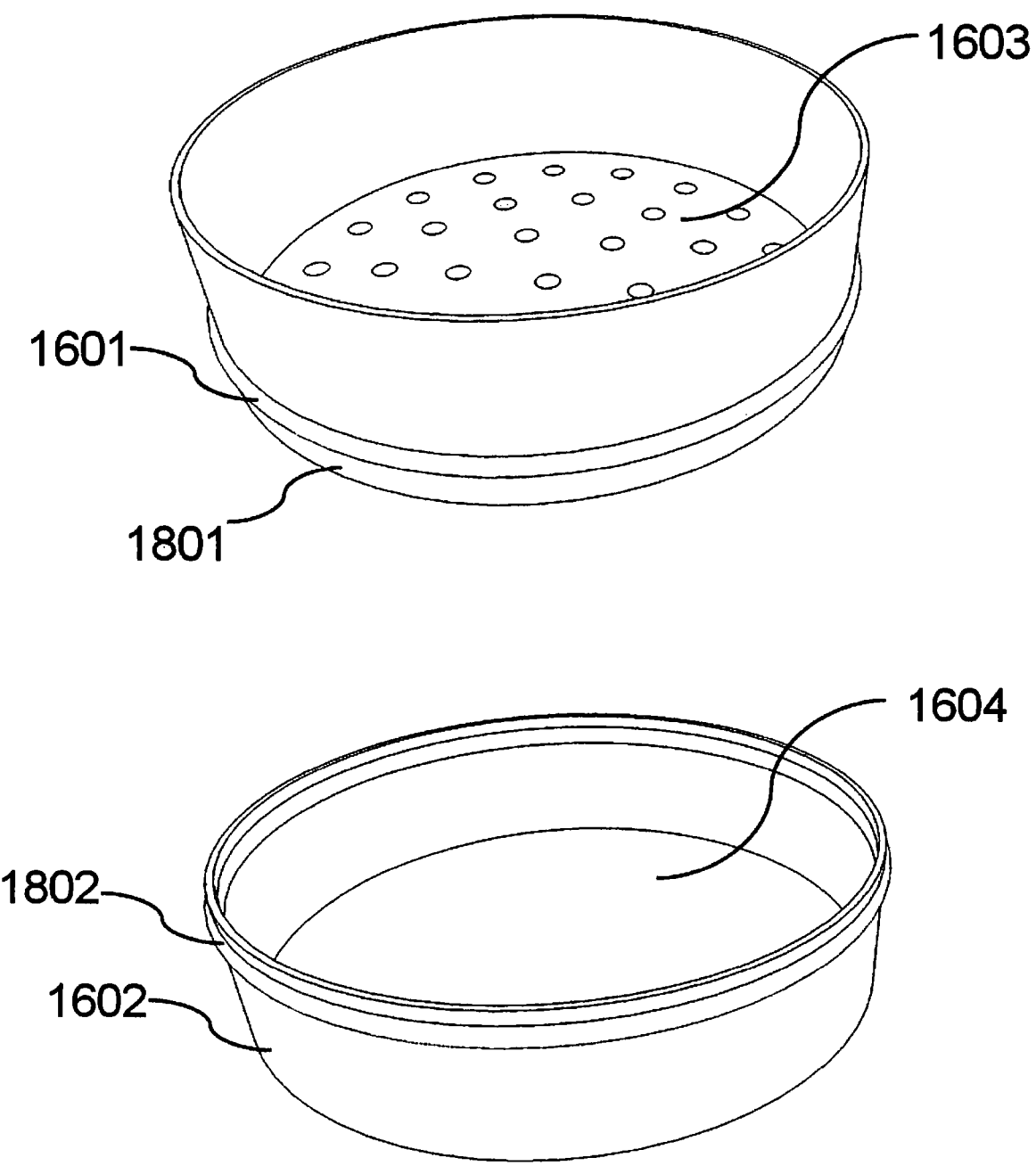
FIG. 18 is a perspective view of a seepage container consisting of two components.

Referring to FIG. 18, a preferred embodiment of the seepage container is shown consisting of two separate components which may be joined together, resulting in a seepage container with a similar configuration of dual compartments as in the previously specified embodiment. Said two components may be joined such as by the component providing compartment 1601 having a ridge 1801 around the exterior of its cylindrical wall and the component providing compartment 1602 having a groove 1802 around the interior of its cylindrical wall, such that said groove can be snapped over said ridge so as to join the two components together in a leak-proof manner, Advantages of this preferred embodiment of the seepage container are that seepage can be removed by detaching compartment 1602 from compartment 1601, so that the tasty seepage liquid may be sipped directly from the detached compartment 1602, and also that manufacture of this seepage container is easier, for example by thermoforming.

Assembled-in-Advance Crate

A preferred embodiment of a crate to transport food products assembled as completely as possible in advance may have the following configuration with respect to the packaged food product and the seepage container. Referring to FIG. 17, the depth of the cylindrical cavity of the crate's cell may equal the height of the seepage container's compartment 1602, so that this compartment 1602 may be completely sunk into the cylindrical cavity of the crate, thus anchoring the food product in the crate, whereas the adjoining compartment 1601 of the seepage container may take position just above the cylindrical cavity of the crate, enabling compartment 1601 to be grasped from the side of the crate in order to raise and remove the seepage container out of the crate, together with the packaged food product above it. The securing bands 1704, 1705 for attachment of the seepage container to the consumer packaging need not be used, since the assembly is held in place by the crate.

Compartmentalized Bag

If the food product is to be consumed away from the point of sale after a time interval which gives an opportunity for moisture from fillings to seep out, the food product with an attached seepage container may be placed in a bag having walls which tightly surround the packaged product, so as to keep it vertical with the seepage container lowermost, below the open end of the packaged food product. If several products are to be consumed away from the point of sale, a bag with more than one compartment inside may be used, so as maintain each product vertically with its seepage container lowermost.

Equipment for Heating

If the food product is to be heated after assembly, this may be performed with the consumer packaging in place and in addition with a cylindrical cover enclosing the uppermost part of the food product 1507, shown in FIG. 15. For even heating of the cylindrical food product in a microwave oven, the food product is optimally placed with its cylindrical axis positioned horizontally on the microwave turntable. After heating, the food product is rotated so that the cylindrical cover is uppermost again and the cover is removed in this position so that no fillings fall out of the edible enclosing tubes.

Assembly Method

In another aspect, the present invention relates to a method for assembling a preferred embodiment of the food product that may comprise the steps below, which may be carried out manually or which may be mechanized, either fully or partially.

(a) Referring to FIG. 8, an edible enclosing tube is formed by placing a flat face of a filling storage tube 809 on an edible enclosing sheet 800 with edges 808 and 801 roughly contiguous and by then wrapping the entire edible enclosing sheet around the filling storage tube until the edible enclosing sheet overlaps on itself, closing the resulting tube across one of its straight walls.

(b) The wrapped filling storage tube is inserted into a vacant compartment of the assembly frame, with the edge 901 of the tube which lies between the two fat sides 902, 903, as shown in FIG. 9, placed as close as possible to an edge which lies at the center of a compartment of the assembly frame, such as the edge 1101 shown in FIG. 11.

(c) The above two steps are repeated until all the items in the selected set of wrapped filling storage tubes have each been placed in its own individual compartment of the assembly frame.

(d) The capping entity on each free end of the wrapped filling storage tubes, this end lying above the assembly frame, is removed. An edible retaining layer, such as composed of savory crackers, is placed to cover the open, fee ends of all the wrapped filling storage tubes in the assembly frame.

(e) The open end of the consumer packaging is lowered over the set of wrapped filling storage tubes in the assembly frame. A band 1504 is wrapped tightly around the center of the consumer packaging, as shown in FIG. 15, and the free end of the band 1504 is fastened to the part of the band 1504 already wound around the packaging.

(f) The assembly frame and the consumer packaging with the set of wrapped filling storage tubes inside is grasped and inverted, so that the packaging is positioned lowermost and the assembly frame is positioned uppermost. The assembly frame is removed from the top of the set of wrapped filling storage tubes.

(g) The capping entities over the uppermost ends of the filling storage tubes are removed, leaving the top part 1507 of the wrapped filling storage tubes visible, as shown in FIG. 15.

The following steps h) to l) may next be executed in whichever order may be preferred, steps i) to l) each being optional:

(h) Referring to FIGS. 5 and 6, for each wrapped filling storage tube in turn, the individual components of the filling storage tube are separately lifted out of the edible enclosing tube and removed.

(i) A different sauce may be injected into each enclosed filling.

(j) The packaged food product may be heated.

(k) A disposable, small, plastic spoon may be placed between the consumer packaging and the food product.

(l) Toppings may be placed over the enclosed fillings.

If the food product is to be prepared an extended amount of time in advance of consumption, steps a) to g) above may first be carried out, then the additional steps m) to p) below concerning the use of seepage containers and crates may be performed before continuing as previously indicated with the standard steps h) to l) above.

(m) A seepage container is attached over the open tops of the filling storage tubes and the packaged food product is inverted so that the seepage container is below the open end of the packaged food product.

(n) If food products are prepared away from the location of final completion of the food products, they may be placed in one or more assembled-in-advance crates and transported.

(o) When it is appropriate to complete assembly, each food product is removed in tur from its crate.

(p) The removable tab on the seepage container may be detached to evacuate any accumulated moisture, or if the seepage container has a detachable compartment in which seepage has accumulated, this compartment may be removed. The consumer packaging may next be inverted so as to place the seepage container uppermost, which may then be removed.

If the food product is not to be consumed soon after completion, it may be assembled from step a) until step k) above, followed by execution of step m) above, which protects any edible retaining layer from becoming moist, since this layer is then positioned above the enclosed fillings. When the consumer is ready to eat the food product, he may execute himself step p) above and the may sprinkle toppings provided in sachets over the open tops of the enclosed fillings. In a variant of the preceding procedure of the present paragraph, if the fillings are of a nature that are liable to moisten the edible enclosing tubes until the consumer eats the food product, the removal of the walls of the filling storage tube described in step h) may be postponed to be carried out after step p) above, instead of after step g), leaving the filling storage tubas in place as long as possible and allowing them to be disassembled when the consumer is ready to eat the food product, thus protecting the edible enclosing tubes.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the present specification.

Further, while the description above refers to the invention, the description may include more than one invention.

The invention claimed is:

1. An individual handheld food product, comprising:
    a plurality of edible enclosing tubes formed of a baked or dry fried dough material, each of the plurality of edible enclosing tubes having,
        an open upper end and an open lower end, which define a height therebetween and which define an axis therebetween that is oriented generally vertically when the food product is eaten,
        a lower end region proximate the open lower end, and
        an upper end region proximate the open upper end;
    a plurality of edible fillings, each of the plurality of edible fillings comprises a different type of food that is separately contained in respective ones of the plurality of edible enclosing tubes; and
    an auxiliary support defining a recess that accommodates the lower end regions of all of the edible enclosing tubes, the auxiliary support is fitted over the open lower ends of all of the edible enclosing tubes and forms an interference fit with a surface of the lower end region of each of the edible enclosing tubes to hold the lower end regions of the edible enclosing tubes together, the auxiliary support having at least one side wall that is disposed around the lower end regions of all of the edible enclosing tubes, and a solid bottom wall that extends across the open lower ends of all of the edible enclosing tubes for supporting the plurality of edible enclosing tubes and for preventing the edible fillings from escaping from the open lower ends of the edible enclosing tubes;
    wherein the plurality of edible enclosing tubes are disposed contiguously side-by-side one another;
    wherein each of the edible enclosing tubes has a cross-sectional shape of a sector of a circle, such that the plurality of edible enclosing tubes together form a generally cylindrical shaped food product; and
    wherein the at least one side wall of the auxiliary support has a height that is in a range of 5% to 33% of the height of each of the edible enclosing tubes, resulting in each of the edible enclosing tubes extending beyond the height of the at least one side wall of the edible auxiliary support.

2. The food product according to claim 1, wherein the at least one side wall of the auxiliary support has a height of between about 1 cm and about 5 cm.

3. The food product according to claim 1, wherein each of the edible enclosing tubes of the plurality of edible enclosing tubes is formed by wrapping a generally square or rectangular edible enclosing sheet around a corresponding one of the plurality of edible fillings.

4. The food product according to claim 1, further comprising a removable filling storage tube interposed between each of the edible enclosing tubes and a respective one of the plurality of edible fillings.

5. The food product according to claim 1, further comprising a removable seepage container fitted to the open upper end of at least one of the edible enclosing tubes of the plurality of edible enclosing tubes.

6. The food product according to claim 5, wherein the seepage container is fitted over the open upper ends of the plurality of edible enclosing tubes.

7. The food product according to claim 1, wherein the height of the food product is between about 5 cm and about 25 cm.

8. The food product according to claim 1, wherein the at least one side wall of the auxiliary support has a height that is in a range of 10% to 25% of a height of the plurality of edible enclosing tubes.

9. The food product according to claim 8, wherein the at least one side wall of the auxiliary support has a height that is in a range of 12% to 18% of a height of the plurality of edible enclosing tubes.

10. The food product according to claim 1, wherein the auxiliary support is formed of an edible material.

11. The food product according to claim 1, wherein the auxiliary support is formed of an unleavened dough material.

12. The food product according to claim 11, wherein the auxiliary support is baked.

13. The food product according to claim 1, wherein the interference fit between the auxiliary support and the surface of the lower end region of each of the edible enclosing tubes inhibits the auxiliary support from becoming detached from the edible enclosing tubes.

* * * * *